(12) United States Patent
Ono et al.

(10) Patent No.: US 10,494,724 B2
(45) Date of Patent: Dec. 3, 2019

(54) PHOTOCHEMICAL REACTION DEVICE

(71) Applicant: Kabushiki Kaisha Toshiba, Minato-ku (JP)

(72) Inventors: Akihiko Ono, Tokyo (JP); Satoshi Mikoshiba, Yamato (JP); Yuki Kudo, Yokohama (JP); Ryota Kitagawa, Tokyo (JP); Jun Tamura, Tokyo (JP); Chingchun Huang, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 348 days.

(21) Appl. No.: 15/260,908

(22) Filed: Sep. 9, 2016

(65) Prior Publication Data

US 2016/0376712 A1    Dec. 29, 2016

Related U.S. Application Data

(63) Continuation of application No. PCT/JP2015/057175, filed on Mar. 11, 2015.

(30) Foreign Application Priority Data

Mar. 11, 2014 (JP) .................................. 2014-048090

(51) Int. Cl.
  *C25B 1/00* (2006.01)
  *C25B 1/10* (2006.01)
  (Continued)

(52) U.S. Cl.
  CPC ................ *C25B 1/003* (2013.01); *C25B 1/10* (2013.01); *C25B 3/04* (2013.01); *C25B 9/08* (2013.01);
  (Continued)

(58) Field of Classification Search
  CPC .. C25B 1/003; C25B 1/10; C25B 3/04; C25B 9/08; C25B 13/04; C25B 15/02; H01G 9/2013; Y02E 60/366; Y02E 70/10
  See application file for complete search history.

(56) References Cited

U.S. PATENT DOCUMENTS

| 4,160,816 A | * 7/1979 | Williams ............... B01J 19/127 |
| | | 136/291 |
| 6,063,258 A | 5/2000 | Sayama et al. |

(Continued)

FOREIGN PATENT DOCUMENTS

| JP | 10-290017 A | 10/1998 |
| JP | 11-157801 A | 6/1999 |

(Continued)

OTHER PUBLICATIONS

Steven Y. Reece, et al., "Wireless Solar Water Splitting Using Silicon-Based Semiconductors and Earth-Abundant Catalysts" Science, vol. 334, Nov. 4, 2011, pp. 645-648.

(Continued)

*Primary Examiner* — Ciel P Thomas
(74) *Attorney, Agent, or Firm* — Oblon, McClelland, Maier & Neustadt, L.L.P.

(57) ABSTRACT

According to one embodiment, a photochemical reaction device includes: a solar cell; an electrolytic tank having a first tank storing a first solution including an oxidant and/or reductant of a redox medium and a second tank storing a second solution including water and/or proton; a first electrode set in the first tank, connected to a positive electrode of the solar cell through a first switching element, and connected to a negative electrode of the solar cell through a second switching element; and a second electrode set in the second tank, connected to the positive electrode of the solar cell through a third switching element, and connected to the (Continued)

negative electrode of the solar cell through a fourth switching element.

16 Claims, 15 Drawing Sheets

(51) Int. Cl.
    *C25B 3/04*     (2006.01)
    *C25B 13/04*     (2006.01)
    *C25B 15/02*     (2006.01)
    *C25B 9/08*     (2006.01)
    *H01G 9/20*     (2006.01)

(52) U.S. Cl.
    CPC .............. *C25B 13/04* (2013.01); *C25B 15/02* (2013.01); *H01G 9/2013* (2013.01); *Y02E 60/366* (2013.01); *Y02E 70/10* (2013.01)

(56) References Cited

U.S. PATENT DOCUMENTS

| | | | | |
|---|---|---|---|---|
| 2007/0246370 | A1* | 10/2007 | Dimroth | C25B 1/04<br>205/628 |
| 2008/0223727 | A1* | 9/2008 | Oloman | B01D 53/326<br>205/413 |
| 2013/0068296 | A1* | 3/2013 | Yoshida | C01B 13/0207<br>136/256 |
| 2013/0186771 | A1* | 7/2013 | Zhai | C25B 3/04<br>205/440 |
| 2014/0097093 | A1* | 4/2014 | Showalter | H02M 3/155<br>205/341 |
| 2015/0252482 | A1 | 9/2015 | Ono et al. | |
| 2015/0252483 | A1 | 9/2015 | Ono et al. | |
| 2016/0186342 | A1 | 6/2016 | Ono et al. | |

FOREIGN PATENT DOCUMENTS

| | | |
|---|---|---|
| JP | 2001-233602 A | 8/2001 |
| JP | 2004-169059 A | 6/2004 |
| JP | 2004-256378 A | 9/2004 |
| JP | 2011-094194 A | 5/2011 |
| JP | 2011-162838 | 8/2011 |
| JP | 2013-253294 | 12/2013 |
| JP | 2014-101550 A | 6/2014 |
| JP | 2014-101551 A | 6/2014 |
| JP | 2014-175245 A | 9/2014 |
| JP | 2015-59231 A | 3/2015 |
| WO | WO-2012077199 A1 * | 6/2012 ............... C25B 1/00 |

OTHER PUBLICATIONS

International Search Report dated Jun. 16, 2015 in PCT/JP2015/057175, filed on Mar. 11, 2015 ( with English Translation).
Written Opinion dated Jun. 16, 2015 in PCT/JP2015/057175, filed Mar. 11, 2015.

* cited by examiner

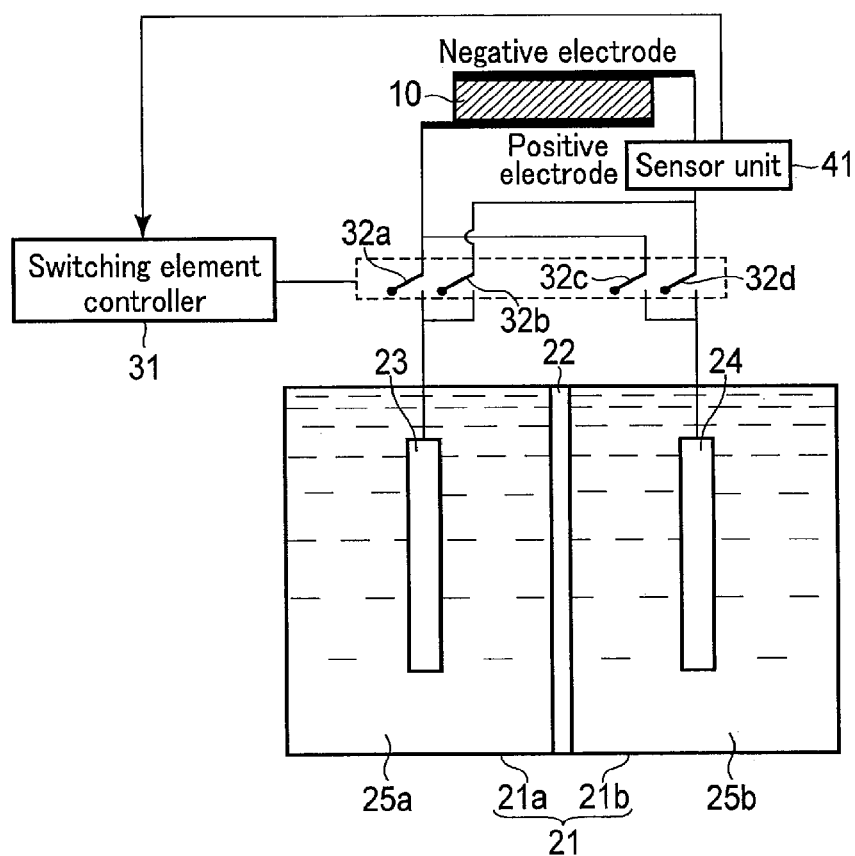
F I G. 6

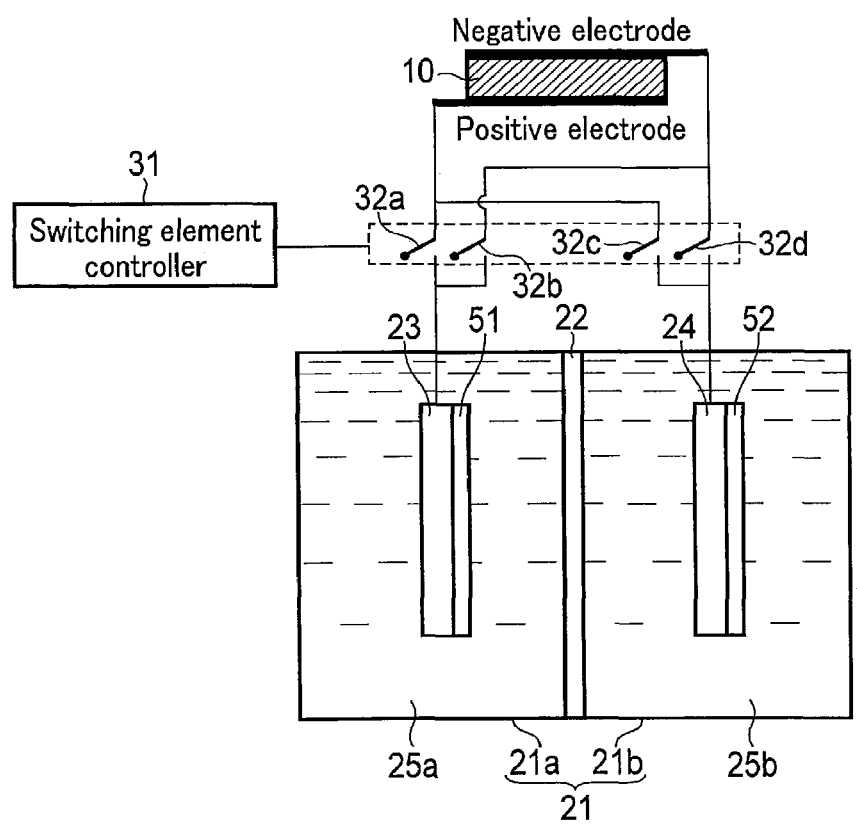
F I G. 9

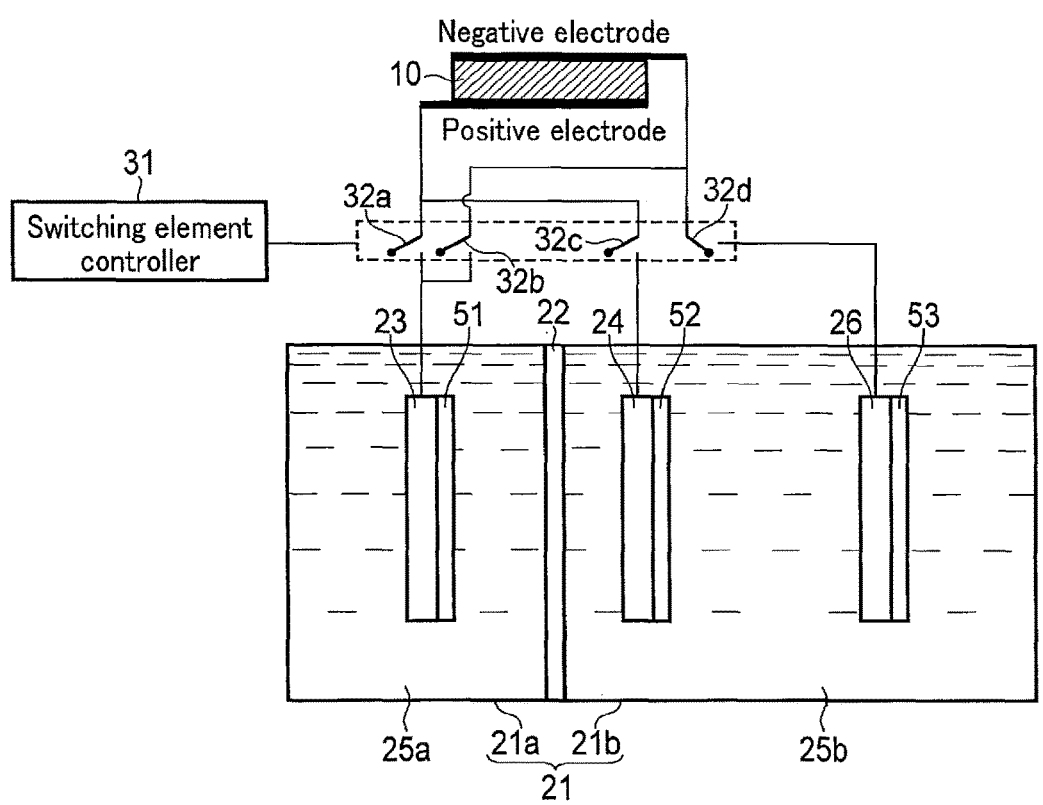
F I G. 10

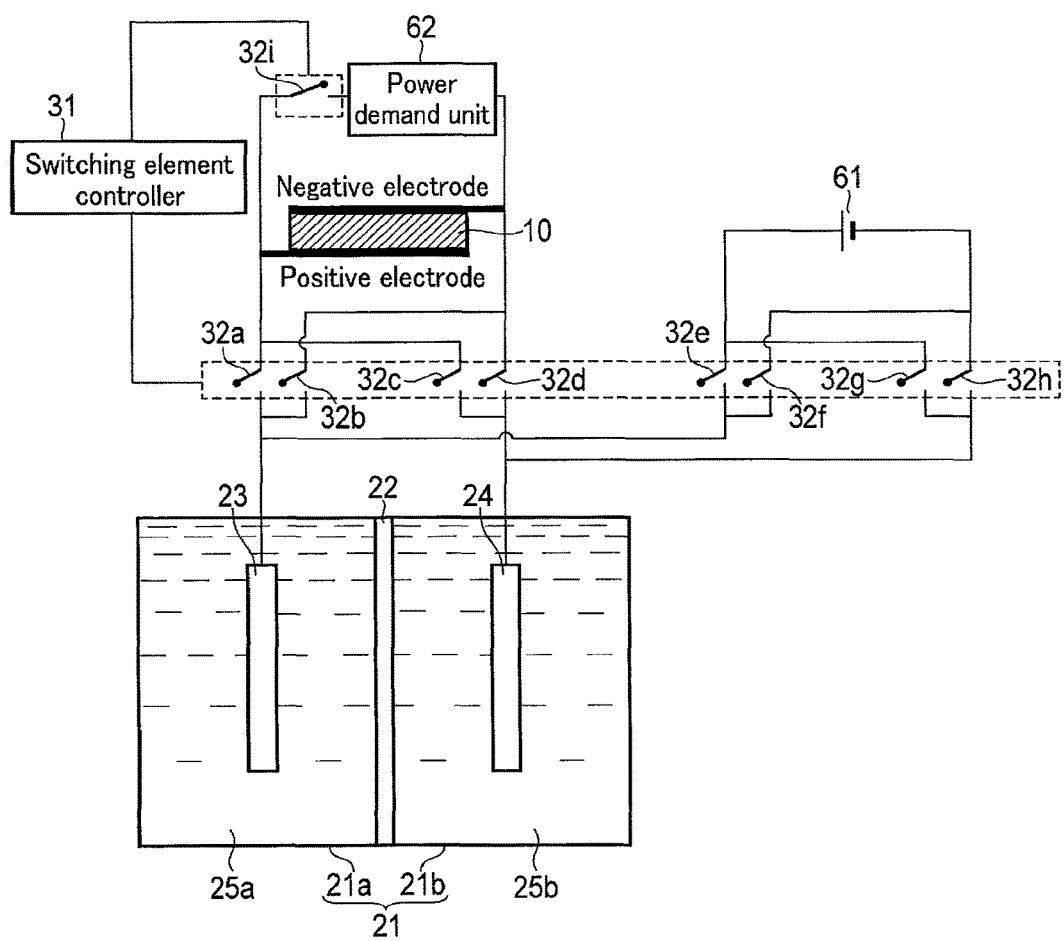
F I G. 13

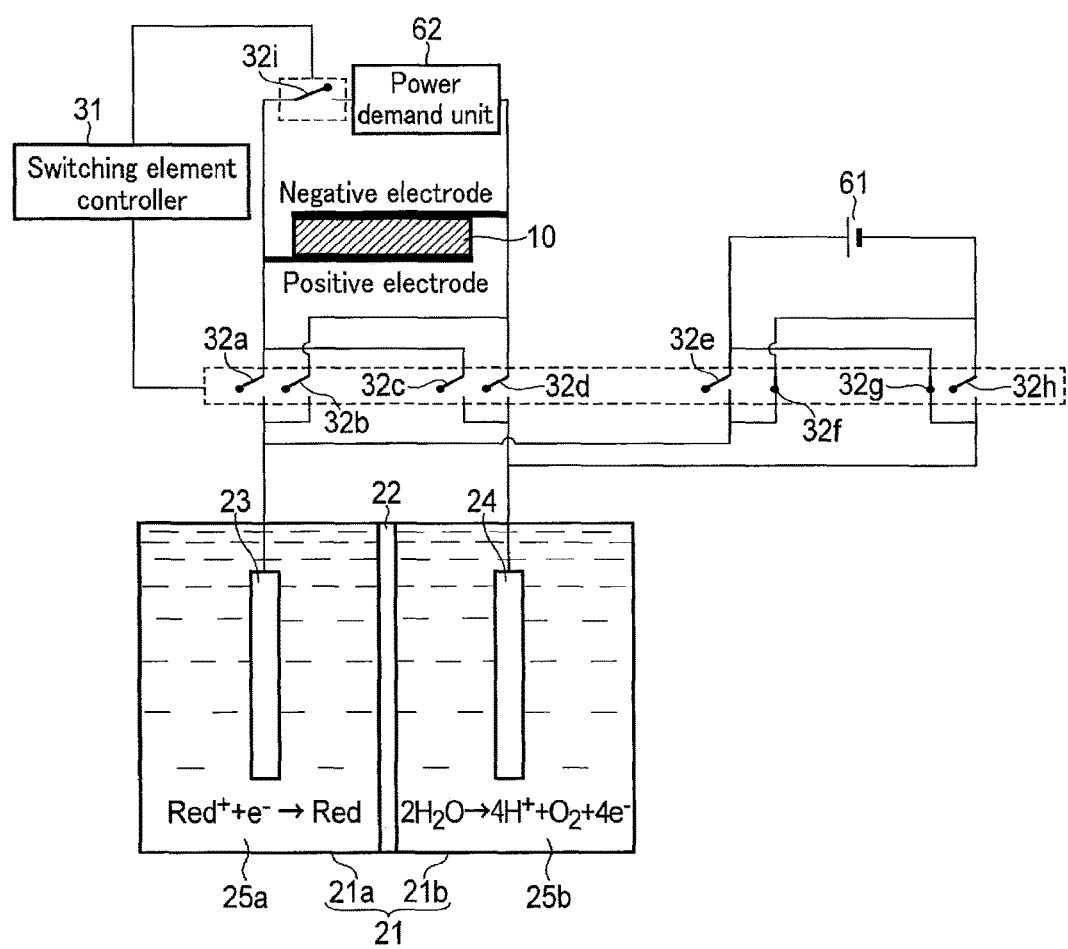
F I G. 14

US 10,494,724 B2

PHOTOCHEMICAL REACTION DEVICE

CROSS REFERENCE TO RELATED APPLICATIONS

This application is a Continuation Application of PCT Application No. PCT/JP2015/057175, filed Mar. 11, 2015 and based upon and claims the benefit of priority from the prior Japanese Patent Application No. 2014-048090, filed Mar. 11, 2014, the entire contents of all of which are incorporated herein by reference.

FIELD

Embodiments described herein relate generally to a photochemical reaction device.

BACKGROUND

From the viewpoint of energy problems and environmental issues, production of a chemical substance (chemical energy), capable of being stored/transported, by light energy (for example, solar energy) is required, such as in plants. Plants use a system called the Z scheme that excites light energy in two stages. According to this constitution, plants use solar energy to obtain electrons from water ($H_2O$) and, thus, to reduce carbon dioxide ($CO_2$), whereby plants synthesize cellulose and sugars.

However, the technology to obtain electrons from water and decompose $CO_2$ by an artificial photochemical reaction to produce chemical energy achieves very low efficiency. For example, Jpn. Pat. Appln. KOKAI Publication No. 2011-094194 discloses a photochemical reaction device including an oxidation reaction electrode that oxidizes $H_2O$ to produce oxygen ($O_2$) and a reduction reaction electrode that reduces $CO_2$ to produce carbon compounds. The oxidation reaction electrode obtains a potential to oxidize $H_2O$ by a semiconductor photocatalyst using light energy. Further, the oxidation reaction electrode oxidizes $H_2O$ to obtain electrons. On the other hand, the reduction reaction electrode obtains a potential to reduce $CO_2$ by a semiconductor photocatalyst using light energy and the electrons obtained by the oxidation reaction electrode. According to this constitution, the reduction reaction electrode reduces $CO_2$ to produce formic acid (HCOOH). Thus, in Jpn. Pat. Appln. KOKAI Publication No. 2011-094194, a Z-scheme type artificial photosynthesis system imitating plants is used to obtain a potential required to reduce $CO_2$ and produce chemical energy.

However, in Jpn. Pat. Appln. KOKAI Publication No. 2011-094194, the conversion efficiency from solar energy to chemical energy is approximately 0.04% and very low. This is because the energy conversion efficiency of semiconductor photocatalysts that can be excited by visible radiation is low.

Jpn. Pat. Appln. KOKAI Publication No. 10-290017 provides a configuration in which a silicon solar cell is used to obtain the reaction potential and catalysts are provided on both sides of the silicon solar cell to produce a reaction. In S. Y. Reece, et al., Science. vol. 334. pp. 645 (2011), a configuration in which silicon solar cells are layered is used to obtain the reaction potential, and catalysts are provided on both sides of the silicon solar cells to produce an electrolytic reaction of $H_2O$. The conversion efficiency from solar energy to chemical energy in both of those devices is 4.7%.

A solar cell used herein is a triple junction solar cell, and the conversion efficiency from solar energy to electrical energy is 8.0%.

However, in a multi-junction solar cell, although the energy conversion efficiency is higher than those of an optical catalyst and a single junction solar cell, the cost also becomes high.

On the other hand, as disclosed in Jpn. Pat. Appln. KOKAI Publication No. 11-157801, in the electrolysis of $H_2O$, 1.23 V is required as a theoretical voltage. Thus, it is difficult to electrolyze $H_2O$ through a one-step reaction using an optical catalyst or a single junction solar cell. Accordingly, in Jpn. Pat. Appln. KOKAI Publication No. 11-157801, a two-step reaction is utilized as in the Z-scheme type artificial photosynthesis system in Jpn. Pat. Appln. KOKAI Publication No. 2011-094194. More specifically, first, using a photocatalyst, $H_2O$ is oxidized to produce $O_2$ and protons ($H^+$) and, at the same time, reduce trivalent iron ion ($Fe^{3+}$) to divalent iron ion ($Fe^{2+}$). Next, using an electrolysis system by a usual external power supply, $Fe^{2+}$ is returned to $Fe^{3+}$ and, at the same time, $H^+$ is reduced to produce hydrogen ($H_2$). Namely, when an oxidant ($Fe^{2+}$) of a redox medium is produced using a low-cost photocatalyst, $H_2$ can be produced while reducing an electrolysis voltage.

However, in this method, it is difficult to collect $O_2$. When solar light is applied, an oxidation reaction of $H_2O$ and a reduction reaction of $Fe^{3+}$ forcibly occur due to a photocatalyst. Thus, after the reduction reaction of $Fe^{3+}$ has reached saturation, an $H_2$ producing reaction is required to forcibly occur. On the other hand, after the oxidation reaction of $Fe^{2+}$ has reached saturation, $Fe^{2+}$ as a reductant disappears, meaning $H_2$ cannot be produced. Although solar light irradiation is required to produce $Fe^{2+}$, the adjustment is difficult because the solar light irradiation depends on weather conditions. Namely, it is difficult to obtain chemical energy, such as $O_2$ and $H_2$, according to demand.

As described above, there is required a device which efficiently converts solar energy into chemical energy according to demand while reducing cost.

BRIEF DESCRIPTION OF THE DRAWINGS

FIG. 6 is a schematic configuration diagram showing a configuration example of a photochemical reaction device according to a second embodiment;

FIG. 9 is a schematic configuration diagram showing a configuration example of a photochemical reaction device according to a fourth embodiment;

FIGS. 10 and 11 are a schematic configuration diagram showing a configuration example of a photochemical reaction device according to a fifth embodiment;

FIG. 13 is a schematic configuration diagram showing a configuration example of a photochemical reaction device according to a sixth embodiment;

FIGS. 14 and 15 are a view showing operation of the photochemical reaction device according to the sixth embodiment when the photochemical reaction device is used as an external power supply electrolysis system.

DETAILED DESCRIPTION

Figure 1:
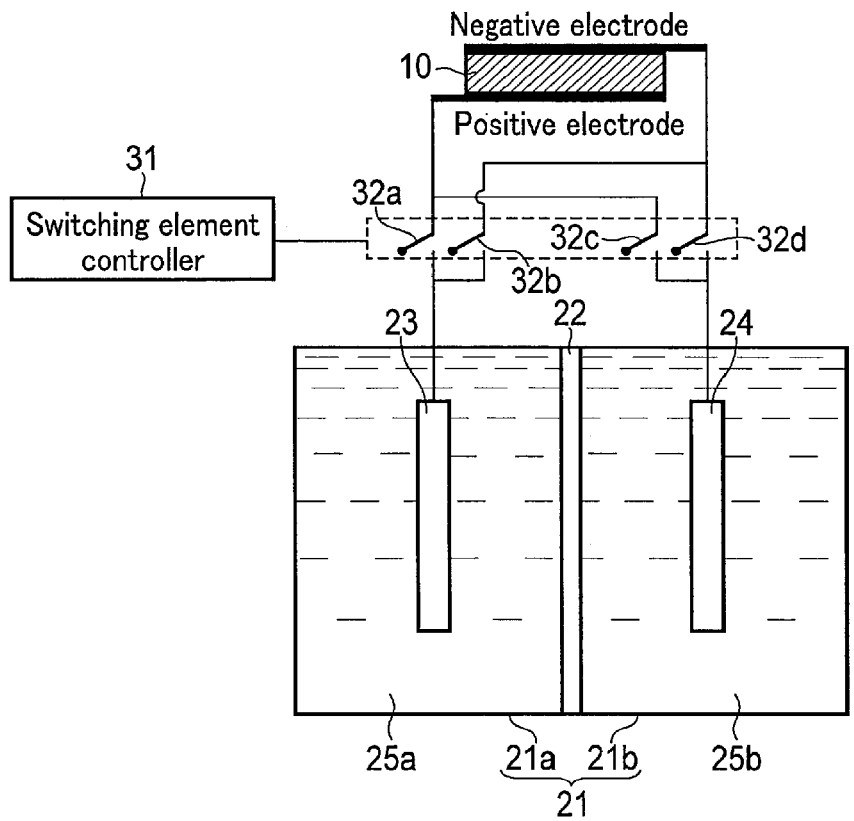
FIG. 1 is a schematic configuration diagram showing a configuration example of a photochemical reaction device according to a first embodiment.

In general, according to one embodiment, a photochemical reaction device includes: a solar cell; an electrolytic tank having a first tank storing a first solution including an oxidant and/or reductant of a redox medium and a second tank storing a second solution including water and/or proton, the first tank and the second tank separated by a permeable membrane; a first electrode set in the first tank, electrically connected to a positive electrode of the solar cell through a first switching element, and electrically connected to a negative electrode of the solar cell through a second switching element; a second electrode set in the second tank, electrically connected to the positive electrode of the solar cell through a third switching element, and electrically connected to the negative electrode of the solar cell through a fourth switching element; and a switching element controller which controls on/off of the first switching element to the fourth switching element. Hereinafter, the present embodiments will be described with reference to the drawings. Referring to the drawings, like numbers indicate like parts throughout the views. Also, a repetitive explanation will be made as needed.

1. First Embodiment

Hereinafter, a photochemical reaction device according to the first embodiment will be described using FIGS. 1 to 5.

In the photochemical reaction device according to the first embodiment, a first electrode 23 is set in a first tank 21a storing an oxidant and/or reductant of a redox medium, and a second electrode 24 is set in a second tank 21b storing $H_2O$ and/or $H^+$. The first electrode 23 is electrically connected to positive and negative electrodes of a solar cell 10 through switching elements 32a and 32b. Likewise, the second electrode 24 is electrically connected to the positive and negative electrodes of the solar cell 10 through switching elements 32c and 32d. According to this constitution, it is possible to achieve a photochemical reaction device which efficiently converts solar energy into chemical energy according to demand while reducing cost. Hereinafter, the first embodiment will be described in detail.

1-1. Configuration of First Embodiment

Figure 2:
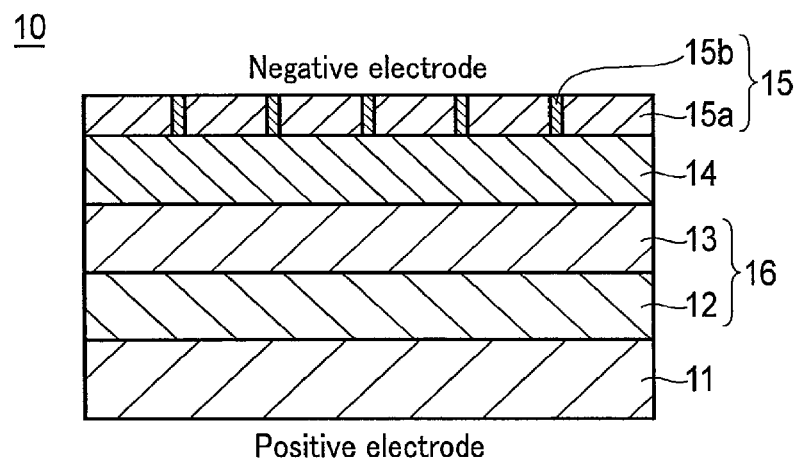
FIG. 2 is a cross-sectional view showing a configuration example of a solar cell according to the first embodiment.

FIG. 1 is a schematic configuration diagram showing a configuration example of the photochemical reaction device according to the first embodiment. FIG. 2 is a cross-sectional view showing a configuration example of the solar cell according to the first embodiment.

As shown in FIG. 1, the photochemical reaction device according to the first embodiment includes the solar cell 10, an electrolytic tank 21, the first electrode 23, the second electrode 24, and a switching element controller 31.

The solar cell 10 is provided outside the electrolytic tank 21. The first electrode 23 is electrically connected to the positive electrode of the solar cell 10 through the switching element 32a, and the second electrode 24 is also electrically connected to the positive electrode of the solar cell 10 through the switching element 32c. On the other hand, the first electrode 23 is electrically connected to the negative electrode of the solar cell 10 through the switching element 32b, and the second electrode 24 is also electrically connected to the negative electrode of the solar cell 10 through the switching element 32d.

As shown in FIG. 2, the solar cell 10 includes a substrate electrode 11, a photovoltaic layer 16, an antireflection layer 14, and a transparent electrode 15. The solar cell 10 has a plate shape expanding in plane, and constituent elements are sequentially formed on the substrate electrode 11 as a base material (substrate). Note that this explanation assumes that the light irradiation side is the obverse surface (upper surface), and the side opposite to the light irradiation side is the reverse surface (lower surface).

The substrate electrode 11 supports the solar cell 10 and is provided to increase its mechanical strength. The substrate electrode 11 has conductivity. The substrate electrode 11 is formed of a metal plate made of, for example, copper (Cu), aluminum (Al), titanium (Ti), nickel (Ni), iron (Fe), or silver (Ag), or an alloy plate such as SUS including at least one of these metals. Further, the substrate electrode 11 may be formed of a conductive resin or the like. Furthermore, the substrate electrode 11 may be formed of a semiconductor substrate such as silicon (Si) or germanium (Ge).

The photovoltaic layer 16 is formed on (the obverse surface of) the substrate electrode 11. The photovoltaic layer 16 has a pn junction semiconductor structure. More specifically, the photovoltaic layer 16 is constituted of, for example, a p-type semiconductor layer 12 and an n-type semiconductor layer 13 formed sequentially from the bottom side. For example, the p-type semiconductor layer 12 is formed of p-type silicon and the n-type semiconductor layer 13 is formed of n-type silicon.

The antireflection layer 14 is formed on the photovoltaic layer 16. The antireflection layer 14 is formed between the photovoltaic layer 16 and the transparent electrode 15. The antireflection layer 14 has a function of allowing light entering from the transparent electrode 15 side to enter the photovoltaic layer 16 without reflecting the light. According to this constitution, a light absorption rate in the photovoltaic layer 16 can be increased.

Note that a reflection layer (not shown) may be formed between the substrate electrode 11 and the photovoltaic layer 16. The reflection layer is formed of a light reflective material such as a distributed Bragg reflection layer including a metal layer or multi-layers of semiconductor materials. The reflection layer is formed between the substrate electrode 11 and the photovoltaic layer 16, whereby light not absorbed by the photovoltaic layer 16 is reflected to enter the photovoltaic layer 16 again. According to this constitution, the light absorption rate in the photovoltaic layer 16 can be further increased.

Meanwhile, the antireflection layer 14 may have a similar function. Namely, the antireflection layer 14 allows light reflected by the reflection layer and not absorbed by the photovoltaic layer 16 to be reflected to enter the photovoltaic layer 16 again. According to this constitution, the light absorption rate in the photovoltaic layer 16 can be further increased.

The transparent electrode 15 is formed on the antireflection layer 14. The transparent electrode 15 is constituted of a transparent conductive oxidant layer 15a and a metal layer 15b penetrating through the transparent conductive oxidant layer 15a. Namely, the transparent electrode 15 has a structure in which the transparent conductive oxidant layer 15a and the metal layer 15b are alternately formed in a film surface direction. The transparent conductive oxidant layer 15a is formed of a material having light transmissive characteristics, such as ITO (Indium Tin Oxide), zinc oxide (ZnO), fluorine-doped tin oxide (FTO), aluminum-doped zinc oxide (AZO), or antimony-doped tin oxide (ATO). The metal layer 15b is formed as an auxiliary electrode compensating electrical characteristics of the transparent conductive oxidant layer 15a of high electrical resistance.

As described above, the transparent electrode 15 is configured such that metal and another conductive material are compounded or a transparent conductive oxide and another conductive material are compounded. In the transparent electrode 15, in order to prevent light absorption by the metal layer 15b, it is desirable to arrange the transparent conductive oxidant layer 15a and the metal layer 15b at an optimum interval in consideration of their resistance values and light transmissive characteristics.

In the photovoltaic layer 16 in the solar cell 10, charge separation occurs due to light energy. Namely, holes are separated to the p-type semiconductor layer 12 side (the substrate electrode 11 side), and electrons are separated to the n-type semiconductor layer 13 side (the transparent electrode 15 side). According to this constitution, the substrate electrode 11 becomes a positive electrode, and the transparent electrode 15 becomes a negative electrode, so that the solar cell 10 generates electromotive force.

The solar cell 10 in this embodiment is a single junction cell having a pair of pn junctions. This is because, as described later, even if the solar cell 10 is a single junction cell, a sufficient electrolysis voltage can be obtained.

In the above description, although the solar cell using a pn junction semiconductor has been explained, a solar cell using a pin junction semiconductor may be applied. Although an example in which the semiconductor layer is formed of Si has been explained, the present invention is not limited thereto, and the semiconductor layer may be formed of Ge. Further, the semiconductor layer may be formed of compound semiconductors such as GaAs, GaInP, AlGaInP, CdTe, CuInGa, or Se. Furthermore, it is possible to apply various forms, such as single-crystal, polycrystalline, and amorphous forms.

In order to expand the reaction range, it is preferable that the solar cell is a single junction cell having an open voltage of not less than 0.9 V. According to this constitution, the power and voltage of the solar cell can be used efficiently.

The electrolytic tank 21 is constituted of the first tank 21a and the second tank 21b separated by a permeable membrane 22.

The first tank 21a stores an electrolytic solution 25a therein. The electrolytic solution 25a is a solution including an oxidant and/or reductant of a redox medium (Red$^+$/Red). The oxidant and/or reductant of the redox medium is $Fe^{3+}$/$Fe^{2+}$, for example. Thus, the electrolytic solution 25a is a liquid including iron sulfate, for example. From the viewpoint of cost, environment, and a catalyst to be described later, the electrolytic solution 25a is preferably iron sulfate, for example. Since iron sulfate is present in nature, it is more preferable. In particular, $Fe^{2+}$ present in nature is used as an energy source. Not only this, but in the redox medium its oxidation-reduction potential may be more than 0 V and less than 1.23 V, and it is desirable that the oxidation-reduction potential is approximately an intermediate value thereof. The oxidant and/or reductant of the redox medium may be monovalent iodine ion ($I^-$)/trivalent iodine ion ($I^{3-}$), for example. In the first tank 21a, an oxidation-reduction reaction of the redox medium occurs.

The second tank 21b stores an electrolytic solution 25b therein. The electrolytic solution 25b is a solution including $H_2O$ and/or $H^+$. Examples of such a solution include a solution including any electrolyte. Examples of the electrolytic solution 25b include a solution including sodium or an electrolytic solution including carbonate ions. When it is difficult to oxidize $H_2O$ due to potential and overvoltage, a sacrificial reagent more preferentially oxidized than $H_2O$ may be added. Examples of the sacrificial reagent include triethanolamine, methanol, ethanol, inorganic salts of silver such as silver nitrate, sulfur, and hydrogen sulfide. In particular, hydrogen sulfide can be used as energy along with use of $Fe^{2+}$ included in volcanic hot spring water or the like. In the second tank 21b, the oxidation reaction of $H_2O$ and the reduction reaction of $H^+$ occur. The permeable membrane 22 is an ion exchange membrane through which ions pass selectively. According to this constitution, only specific ions can be moved while an electrolytic solution is separated between the first tank 21a and the second tank 21b. Namely, the electrolytic tank 21 has a diaphragm structure that allows materials to pass selectively.

The first electrode 23 is set in the first tank 21a. According to this constitution, when the electrolytic solution 25a is stored in the first tank 21a, the first electrode 23 reacts with the electrolytic solution 25a by being brought into contact therewith. The first electrode 23 is electrically connected to the solar cell 10 by an electric wire. More specifically, the first electrode 23 is electrically connected to the positive electrode of the solar cell 10 through the switching element 32a and electrically connected to the negative electrode of the solar cell 10 through the switching element 32b. The first electrode 23 is formed of a metal such as Ag, gold (Au), Al, Cu, nickel (Ni), Fe, bismuth (Bi), or cobalt (Co) or alloy including at least one of the metals.

The second electrode 24 is set in the second tank 21b. According to this constitution, when the electrolytic solution 25b is stored in the second tank 21b, the second electrode 24 reacts with the electrolytic solution 25b by being brought into contact therewith. The second electrode 24 is electrically connected to the solar cell 10 by an electric wire. More specifically, the second electrode 24 is electrically connected to the positive electrode of the solar cell 10 through the switching element 32c and electrically connected to the negative electrode of the solar cell 10 through the switching element 32d. The second electrode 24 is formed of metal such as Ag, Au, Al, Cu, Ni, Fe, Bi, or Co or alloy including at least one of the metals.

The switching element controller 31 controls on/off of the switching elements 32a, 32b, 32c, and 32d, depending on various conditions. When the switching elements 32a, 32b, 32c, and 32d are thus controlled, the first electrode 23 and the second electrode 24 can be connected to both the positive electrode and the negative electrode.

For example, when $O_2$ is required to be produced, the switching element controller 31 turns the switching elements 32b and 32c on and turns the switching elements 32a and 32d off. According to this constitution, the first electrode 23 is electrically connected to the negative electrode of the solar cell 10, and the second electrode 24 is electrically connected to the positive electrode of the solar cell 10. Accordingly, while the reduction reaction of the oxidant of the redox medium occurs in the first tank 21a, the oxidation reaction of $H_2O$ occurs in the second tank 21b to produce $O_2$. In this case, in order to prevent an oxidation reaction of materials other than $H_2O$ (such as the above-described sacrificial reagent) in the electrolytic solution 25b, the catalyst provided on a surface of the second electrode 24 must be selective.

On the other hand, for example when $H_2$ is required to be produced, the switching element controller 31 turns the switching elements 32a and 32d on and turns the switching elements 32b and 32c off. According to this constitution, the first electrode 23 is electrically connected to the positive electrode of the solar cell 10, and the second electrode 24 is electrically connected to the negative electrode of the solar cell 10. Accordingly, while the oxidation reaction of the oxidant of the redox medium occurs in the first tank 21a, the reduction reaction of $H^+$ occurs in the second tank 21b to produce $H_2$.

The details of the oxidation-reduction reaction in the first tank 21a (the oxidant and the reductant of the redox medium) and the second tank 21b ($H_2O$ and $H^+$) will be described later.

1-2. Operation of First Embodiment

Figure 3:
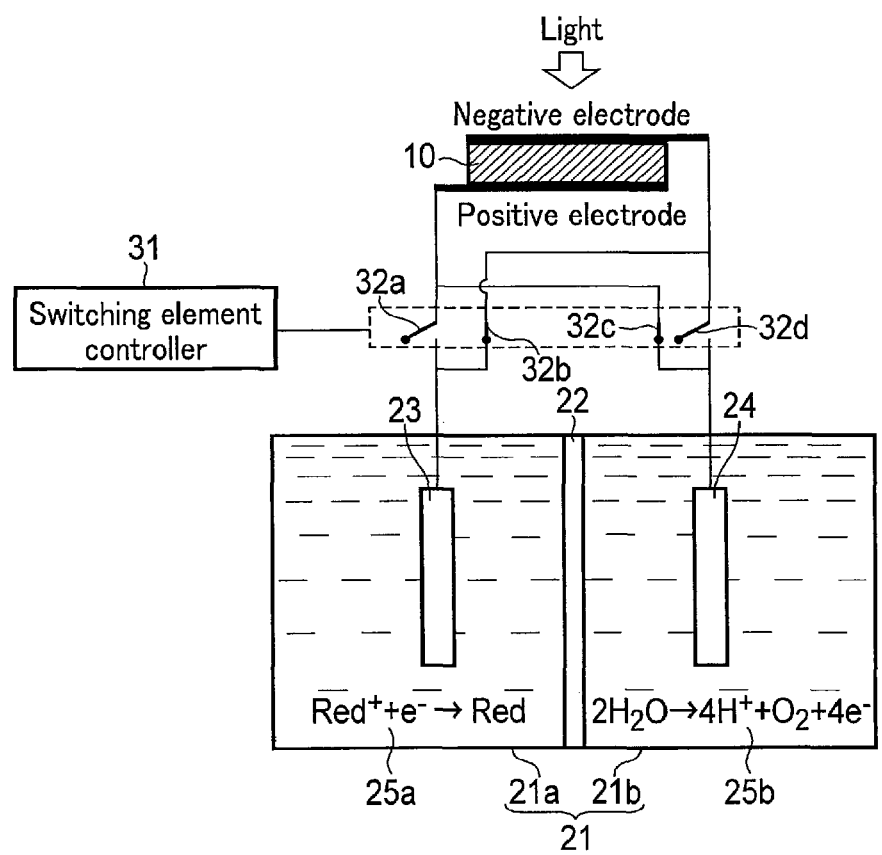
FIGS. 3 and 4 are a view showing an operation of the photochemical reaction device according to the first embodiment.
Figure 4:
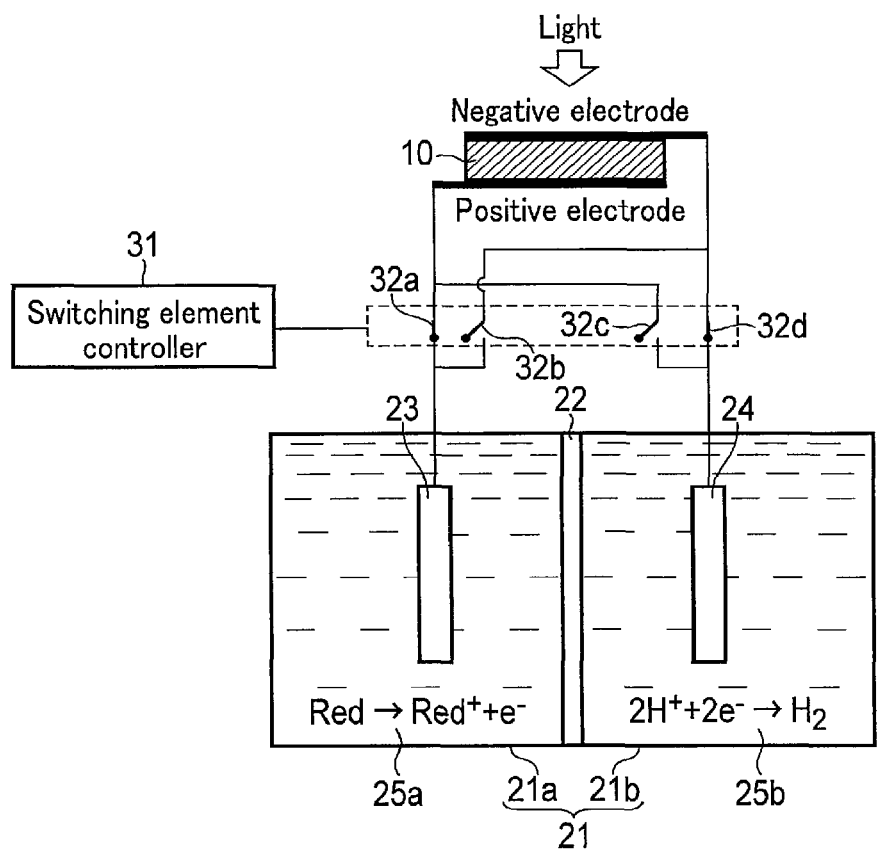

FIGS. 3 and 4 are views showing operation of the photochemical reaction device according to the first embodiment. More specifically, FIG. 3 shows the reduction reaction of the oxidant of the redox medium and the oxidation reaction of $H_2O$, and FIG. 4 shows the reduction reaction of the oxidant of the redox medium and the oxidation reaction of $H^+$.

As shown in FIG. 3, when oxygen is demanded, the switching element controller 31 turns the switching element 32a off and turns the switching element 32b on. Consequently, the first electrode 23 is electrically connected to the negative electrode of the solar cell 10. On the other hand, the switching element controller 31 turns the switching element 32d off and turns the switching element 32c on. Consequently, the second electrode 24 is electrically connected to the positive electrode of the solar cell 10.

Meanwhile, the electrolytic solution 25a including a redox medium is stored in the first tank 21a so as to be in contact with the first electrode 23. At this time, the electrolytic solution 25a preferably includes an oxidant as the redox medium. Here, the oxidant means one that has an oxidation power. In other words, the oxidant takes electrons from another material to oxidize the material and obtains the electrons to be reduced. Meanwhile, the electrolytic solution 25b including $H_2O$ is stored in the second tank 21b so as to be in contact with the second electrode 24.

If light is applied from above (the transparent electrode 15 side) in the above state, the irradiated light passes through the transparent electrode 15 to reach the photovoltaic layer 16. The photovoltaic layer 16 having absorbed the light generates electrons and holes paired therewith and separates them. Namely, in the photovoltaic layer 16, the electrons move toward the n-type semiconductor layer 13 (the transparent electrode 15), and the holes generated as a pair with the electrons move toward the p-type semiconductor layer 12 (the substrate electrode 11), so that charge separation occurs. Consequently, an electromotive force is generated in the solar cell 10.

The electrons generated in the photovoltaic layer 16 and having moved to the transparent electrode 15 which is the electrode on the negative electrode side further move to the first electrode 23 through electric wires. The electrons having moved to the first electrode 23 are used in the reduction reaction near the first electrode 23. On the other hand, the holes generated in the photovoltaic layer 16 and having moved to the substrate electrode 11 further move to the second electrode 24 through electric wires. The electrons having moved to the second electrode 24 are used in the oxidation reaction near the second electrode 24. More specifically, the reaction represented by the formula (1) occurs near the first electrode 23 which is in contact with the electrolytic solution 25a, and the reaction represented by the formula (2) occurs near the second electrode 24 which is in contact with the electrolytic solution 25b.

$$Red^+ + e^- \rightarrow Red \quad (1)$$

$$2H_2O \rightarrow 4H^+ + O_2 + 4e^- \quad (2)$$

As shown in the formula (1), in the vicinity of the first electrode 23, the redox medium $Red^+$ is reduced (obtains electrons) to produce the redox medium Red, that is, a reductant of the redox medium. For example, if the redox medium is $Fe^{3+}/Fe^{2+}$, $Fe^{3+}$ is reduced to produce $Fe^{2+}$.

On the other hand, as shown in the formula (2), in the vicinity of the second electrode 24, $H_2O$ is oxidized (loses electrons) to produce $O_2$ and $H^+$.

At that time, the solar cell 10 is required to have an open voltage not less than an absolute value of a potential difference between a standard oxidation-reduction potential in the reduction reaction occurring in the first electrode 23 and a standard oxidation-reduction potential in the oxidation reaction occurring in the second electrode 24. The standard oxidation-reduction potential in the oxidation reaction in the formula (2) is +1.23 [V] (based on a standard hydrogen electrode (SHE)). If the redox medium is $Fe^{3+}/Fe^{2+}$, the standard oxidation-reduction potential in the reduction reaction in the formula (1) is 0.77 [V] (based on a standard hydrogen electrode (SHE)). Thus, the open voltage of the solar cell 10 is required to be not less than 0.46 [V]. Since this is based on a difference in pH between the electrolytic solution 25a and the electrolytic solution 25b, a difference between the open voltage and the standard hydrogen electrode (SHE) reference is required to be at least not less than 0.46 [V]. More preferably, the open voltage is required to be not less than a potential difference including an overvoltage.

As described above, $O_2$ can be produced by the reduction reaction of the redox medium and the oxidation reaction of $H_2O$. At this time, only $O_2$ is produced as a gas in the second tank 21b, and therefore, $O_2$ can be easily collected.

As shown in FIG. 4, when hydrogen is demanded, the switching element controller 31 turns the switching element 32b off and turns the switching element 32a on. Consequently, the first electrode 23 is electrically connected to the positive electrode of the solar cell 10. On the other hand, the switching element controller 31 turns the switching element 32c off and turns the switching element 32d on. Consequently, the second electrode 24 is electrically connected to the negative electrode of the solar cell 10.

Meanwhile, the electrolytic solution 25a including a redox medium is stored in the first tank 21a so as to be in contact with the first electrode 23. At this time, the electrolytic solution 25a preferably includes a reductant as the redox medium. Here, the reductant means one that has a reduction power. In other words, the reductant is oxidized itself to lose electrons and gives the electrons to another material to reduce the material. Meanwhile, the electrolytic solution 25b including $H^+$ is stored in the second tank 21b so as to be in contact with the second electrode 24.

If light is applied from above (the transparent electrode 15 side) in the above state, charge separation occurs in the photovoltaic layer 16. Consequently, an electromotive force is generated in the solar cell 10.

The electrons generated in the photovoltaic layer 16 and having moved to the transparent electrode 15 which is the electrode on the negative electrode side further move to the second electrode 24 through electric wires. The electrons having moved to the second electrode 24 are used in the reduction reaction near the second electrode 24. On the other hand, the holes generated in the photovoltaic layer 16 and having moved to the substrate electrode 11 which is the electrode on the positive electrode side further move to the first electrode 23 through electric wires. The electrons having moved to the first electrode 23 are used in the oxidation reaction near the first electrode 23. More specifically, the reaction represented by the formula (3) occurs near the first electrode 23 which is in contact with the electrolytic solution 25a, and the reaction represented by the formula (4) occurs near the second electrode 24 which is in contact with the electrolytic solution 25b.

$$Red \rightarrow Red^+ + e^- \quad (3)$$

$$2H^+ + 2e^- \rightarrow H_2 \quad (4)$$

As shown in the formula (3), in the vicinity of the first electrode 23, the redox medium Red is oxidized (loses electrons) to produce the redox medium $Red^+$, that is, an oxidant of the redox medium. For example, if the redox medium is $Fe^{3+}/Fe^{2+}$, $Fe^{2+}$ is reduced to produce $Fe^{3+}$.

On the other hand, as shown in the formula (4), in the vicinity of the second electrode 24, $H^+$ is reduced (obtains electrons) to produce $H_2$.

At that time, the solar cell 10 is required to have an open voltage not less than an absolute value of a potential difference between a standard oxidation-reduction potential in the reduction reaction occurring in the first electrode 23 and a standard oxidation-reduction potential in the oxidation reaction occurring in the second electrode 24. The standard oxidation-reduction potential in the oxidation reaction in the formula (4) is 0 [V] (based on a standard hydrogen electrode (SHE)). If the redox medium is $Fe^{3+}/Fe^{2+}$, the standard oxidation-reduction potential in the reduction reaction in the formula (3) is 0.77 [V] (based on a standard hydrogen electrode (SHE)). Thus, the open voltage of the solar cell 10 is required to be not less than 0.77 [V]. Since this is also based on the difference in pH between the electrolytic solution 25a and the electrolytic solution 25b, a difference between the open voltage and the standard hydrogen electrode (SHE) reference is required to be at least not less than 0.77 [V]. More preferably, the open voltage is required to be not less than a potential difference including an overvoltage.

As described above, $H_2$ can be produced by the oxidation reaction of the redox medium and the reduction reaction of $H^+$. At this time, only $H_2$ is produced as a gas in the second tank 21b, and therefore, $H_2$ can be easily collected.

As described above, even if the oxidation/reduction reaction shown in FIGS. 3 and 4 is repeated, the redox medium does not change in totality. Namely, $H_2O$ can be electrolyzed while repeatedly using the redox medium.

The standard oxidation-reduction potential of the redox medium ($Red/Red^+$) is set to be smaller than the standard oxidation-reduction potential of $H_2O$ ($H_2O/O_2$) and larger than the standard oxidation-reduction potential of $H^+$ ($H^+/$ $H_2$). Namely, the standard oxidation-reduction potential of the redox medium is set to be more than 0 V and less than 1.23 V. More desirably, the standard oxidation-reduction potential of the redox medium is an approximately intermediate value between the standard oxidation-reduction potential of $H_2O$ and the standard oxidation-reduction potential of $H^+$. By virtue of the use of such a redox medium, $H_2O$ can be electrolyzed at a low open voltage.

For example, when the standard oxidation-reduction potential of the redox medium is set to an approximately intermediate value between the standard oxidation-reduction potential of $H_2O$ and the standard oxidation-reduction potential of $H^+$, an open voltage required by the solar cell 10 can be halved. In other words, it is possible to generate a chemical reaction having an oxidation-reduction potential twice that of the open voltage according to the solar cell 10.

In the reduction reaction of the redox medium and the oxidation reaction of $H_2O$ shown in FIG. 3, when it is difficult to oxidize $H_2O$ due to an influence of potential or overvoltage, a sacrificial reagent more preferentially oxidized than $H_2O$ may be added to the electrolytic solution 25b. The standard oxidation-reduction potential of the sacrificial reagent is smaller than the standard oxidation-reduction potential of $H_2O$ ($H_2O/O_2$) and larger than the standard oxidation-reduction potential of the redox medium ($Red/Red^+$). Examples of such a sacrificial reagent include organic matter such as triethanolamine, methanol, and ethanol, inorganic salts of silver such as silver nitrate, sulfur, and hydrogen sulfide. These materials present in nature can be supplementarily used as energy. For example, volcanic hydrogen sulfide, $Fe^{2+}$ of an acid mine drainage, or the like is exemplified. In addition, industrial wastewater or the like may be used, and they may be mixed.

More specifically, when triethanolamine (TEOA) is used, the oxidation reaction represented by the following formula (2a) occurs, and when methanol ($CH_3OH$) is used, the oxidation reaction represented by the following formula (2b) occurs.

$$TEOA \rightarrow TEOA^+ + e^- \quad (2a)$$

$$CH_3OH + O_2 \rightarrow CO_2 + H_2O + 2H^+ + 2e^- \quad (2b)$$

As described above, when the oxidation reaction is performed near the second electrode 24, the reduction reaction of the redox medium in the first electrode 23 can be promoted.

In the second tank 21b, not the reduction reaction of $H_2O$ ($H^+$) but the reduction reaction of $CO_2$ may be performed. In this case, the electrolytic solution 25b desirably has a $CO_2$ absorbent which reduces the reduction potential of $CO_2$, has high ion conductivity, and absorbs $CO_2$.

In the reduction reaction in the second tank 21b, the oxidation reaction and the reduction reaction of the same material are sometimes repeated by a switching operation, according to components of the electrolytic solution 25b. For example, when formic acid is produced by the reduction reaction of $CO_2$, the oxidation reduction of the produced formic acid causes producing $CO_2$. The problem of energy loss due to circulation of the same material in the oxidation-reduction reaction can be solved by the selectivity of the catalyst provided on the surface of the second electrode 24, as described above. It is desirable that a gaseous substance such as CO is produced by the reduction reaction of $CO_2$. When Co which is a gaseous substance is produced, CO can be immediately separated and collected, and even if the catalyst selectivity is poor, energy loss due to the circulation of the same material can be prevented.

Examples of the electrolytic solution 25b as described above include an ionic liquid, which comprises a salt of a positive ion such as an imidazolium ion or a pyridinium ion and a negative ion such as $BF^{4-}$ or $PF^{6-}$ and is in a liquid state in a wide temperature range, and an aqueous solution of the ionic liquid. In addition, examples of the electrolytic solution include an amine solution such as ethanolamine, imidazole, or pyridine and an aqueous solution thereof. Any of a primary amine, a secondary amine, or a tertiary amine may be used. Examples of a primary amine include a methylamine, ethylamine, propylamine, butylamine, pentylamine, hexylamine, or the like. A hydrocarbon of the amine may be substituted with an alcohol, halogen, or the like. Examples of an amine whose hydrocarbon has been substituted include methanolamine, ethanolamine, and chloromethylamine. An unsaturated bond may exist. The substitution of hydrocarbons applies to a secondary amine and a tertiary amine as well. Examples of a secondary amine include a dimethylamine, diethylamine, dipropylamine, dibutylamine, dipentylamine, dihexylamine, dimethanolamine, diethanolamine, and dipropanolamine.

Substituted hydrocarbons may be different. This also applies to a tertiary amine. Examples of amines with different hydrocarbons include methylethylamine and methylpropylamine. Examples of a tertiary amine include a trimethylamine, triethylamine, tripropylamine, tributylamine, trihexylamine, trimethanolamine, triethanolamine, tripropanolamine, tributanolamine, tripropanolamine, trihexanolamine, methyldiethylamine, or methyldipropylamine. Examples of a cation in an ionic liquid include a 1-ethyl-3-methylimidazolium ion, 1-methyl-3-propylimidazolium ion, 1-butyl-3-methylimidazole ion, 1-methyl-3-pentylimidazolium ion, and 1-hexyl-3-methylimidazolium ion. Position 2 of an imidazolium ion may be substituted. Examples of such an imidazolium ion whose position 2 has been substituted include a 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, and 1-hexyl-2,3-dimethylimidazolium ion. Examples of a pyridinium ion include methylpyridinium, ethylpyridinium, propylpyridinium, butylpyridinium, pentylpyridinium, and hexylpyridinium. For both an imidazolium ion and pyridinium ion, an alkyl group may be substituted, and an unsaturated bond may exist. Examples of an anion include a fluoride ion, chloride ion, bromide ion, iodide ion, $BF^{4-}$, $PF^{6-}$, $CF_3COO^-$, $CF_3SO^{3-}$, $NO^{3-}$, $SCN^-$, $(CF_3SO_2)_3C^-$, bis (trifluoromethoxysulfonyl) imide, and bis(perfluoroethylsulfonyl)imide. A dipolar ion made by binding a cation and an anion in an ionic liquid with a hydrocarbon may be used as well.

Examples of the reduction reaction of $CO_2$ include a reduction reaction from $CO_2$ to a carbon compound such as carbon monoxide (CO), HCOOH, methane ($CH_4$), ethylene ($C_2H_4$), $CH_3OH$, or ethanol ($C_2H_5OH$). A $CO_2$ reduced substance to be produced can be changed by changing a water ($H_2O$) amount in a solution. For example, it is possible to change the production ratio of CO, HCOOH, $CH_4$, $CH_3OH$, $C_2H_5OH$, or $H_2$. As described above, from the viewpoint of separation of a product, it is preferable that a gaseous substance such as CO is produced.

The temperature of the electrolytic solution 25b filled in the second tank 21b may be the same as or different from the ambient temperature (room temperature) according to the use environment. For example, if the electrolytic solution 25b is an amine absorption solution including $CO_2$ discharged from a factory, the temperature of the electrolytic solution 25b is higher than the ambient temperature. In this case, the temperature of the electrolytic solution 25b is not less than 30° C. and not more than 150° C. and more preferably not less than 40° C. and not more than 120° C.

The ion exchange membrane (the permeable membrane 22) is a proton exchange membrane and can move $H^+$ produced in the first tank 21a toward the second tank 21b in which the second electrode 24 is set and can reverse it. Examples of the ion exchange membrane include a cation exchange membrane, such as Nafion or Flemion, or an anion exchange membrane, such as Neoceptor or Selemion. Instead of the ion exchange membrane, an agar such as a salt bridge or the like, through which ions can move and which separates an electrolytic solution may be used. In general, if a proton exchangeable solid polymer membrane typified by Nafion is used, the ion transport performance is good.

Further, a temperature difference may be caused to occur in the electrolytic solutions 25a and 25b using heat that moves upward by application of light to the surface of the solar cell 10. Consequently, diffusion of ions is reduced, and the ions can be circulated more efficiently. In other words, movement of ions can be promoted by convection other than ion diffusion.

Meanwhile, a flow passage is provided in the electrolytic tank 21, and a temperature adjusting mechanism which adjusts the temperatures of the electrolytic solutions 25a and 25b may be provided in the flow passage or the electrolytic tank 21. The performance of the solar cell 10 can be controlled by such temperature control. Consequently, for example, in order to stabilize and enhance the performance of the solar cell 10, a temperature of a reaction system can be uniformized. Further, for system stabilization, a temperature increase can be prevented. Furthermore, the type of product can be controlled by the temperature control.

A reaction is sometimes reduced by a diffusion velocity accompanying movement of ions. Thus, before the diffusion velocity is reduced, connection between the first electrode 23 and the second electrode 24 and the positive electrode and the negative electrode of the solar cell 10 may be switched. Namely, the oxidation-reduction reaction may be switched so as to be performed more efficiently.

1-3. Effects of First Embodiment

According to the first embodiment, the first electrode 23 is set in the first tank 21a storing the oxidant and/or reductant of the redox medium, and the second electrode 24 is set in the second tank 21b storing $H_2O$ and/or $H^+$. The first electrode 23 is electrically connected to the positive electrode of the solar cell 10 through the switching element 32a and electrically connected to the negative electrode of the solar cell 10 through the switching element 32b. Similarly, the second electrode 24 is electrically connected to the positive electrode of the solar cell 10 through the switching element 32c and electrically connected to the negative electrode of the solar cell 10 through the switching element 32d. When turning on/off of each of the switching elements 32a, 32b, 32c, and 32d is controlled, the oxidation of $H_2O$ and the oxidation reaction of the oxidant of the redox medium can be switched to the oxidation reaction of the reductant of the redox medium and the reduction reaction of $H^+$ according to demand of a product.

Figure 5:
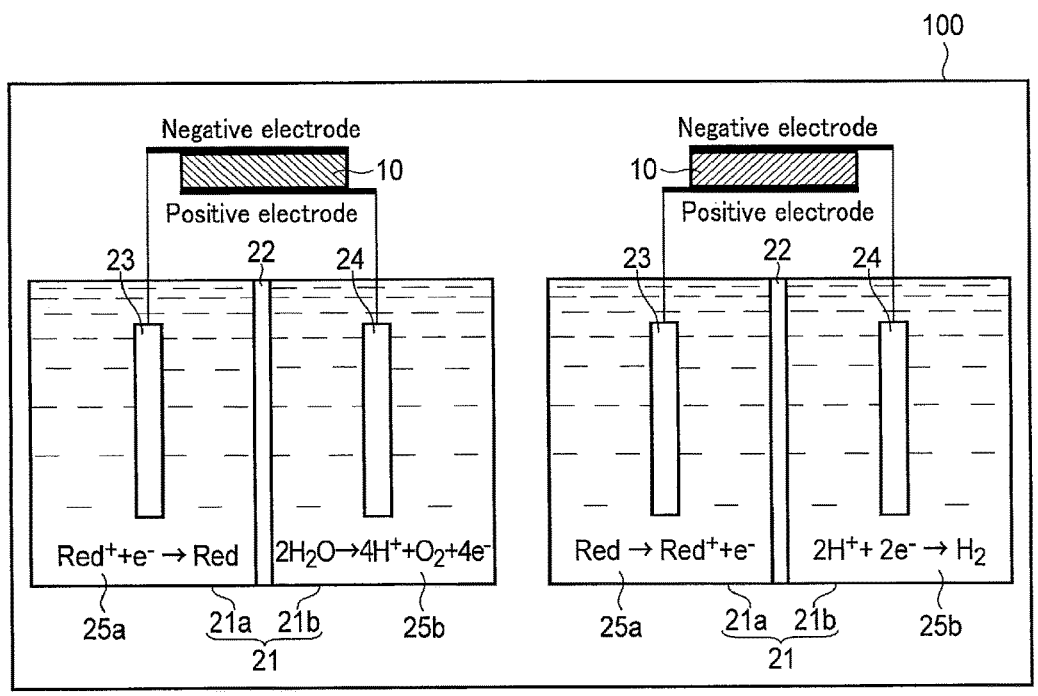
FIG. 5 is a schematic configuration diagram showing a configuration example of a photochemical reaction device according to a comparative example.

FIG. 5 is a schematic configuration diagram showing a configuration example of a photochemical reaction device 100 according to a comparative example.

As shown in FIG. 5, in a comparative example in which the switching elements 32a, 32b, 32c, and 32d are not provided, the connection of the first and second electrodes 23 and 24 and the positive and negative electrodes of the solar cell 10 cannot be switched. In other words, the first electrode 23 is connected to only one of the positive and negative electrodes of the solar cell 10. Likewise, the second electrode 24 is connected to only one of the positive and negative electrodes of the solar cell 10.

Thus, as illustrated, the oxidation of $H_2O$ and the reduction reaction of the oxidant of the redox medium and the oxidation reaction of the reductant of the redox medium and the reduction reaction of $H^+$ should be performed by different devices. Accordingly, an installation area for the devices and cost are increased.

On the other hand, in the first embodiment, the switching elements 32a, 32b, 32c, and 32d can be controlled and switched. Thus, the oxidation of $H_2O$ and the reduction reaction of the oxidant of the redox medium and the oxidation reaction of the reductant of the redox medium and the reduction reaction of Fr can be generated by using the electrolytic tank 21 and the solar cell 10. Accordingly, as compared with the comparative example, the cost and the installation area can be reduced.

In the first embodiment, $H_2O$ is electrolyzed using the redox medium. According to this constitution, an open voltage required by the solar cell 10 can be reduced. Thus, as the solar cell 10, a single junction solar cell in which although a generated voltage is low, the cost is low can be used. Accordingly, a reduction in cost and an increase in energy efficiency can be further achieved.

2. Second Embodiment

Hereinafter, a photochemical reaction device according to the second embodiment will be described using FIG. 6.

In the photochemical reaction device according to the second embodiment, a sensor unit 41 is electrically connected between a first electrode 23 and a second electrode 24 and a solar cell 10. According to this constitution, it is possible to suitably adjust conditions of electrolytic solutions 25a and 25b and an electrolytic tank 21 used for promoting an electrolysis reaction. In addition, turning on/off of each of switching elements 32a, 32b, 32c, and 32d can be automatically switched. Hereinafter, the second embodiment will be described in detail.

In the second embodiment, the description of points similar to the first embodiment will be omitted, and points different from the first embodiment will be mainly described.

2-1. Configuration of Second Embodiment

FIG. 6 is a schematic configuration diagram showing a configuration example of the photochemical reaction device according to the second embodiment.

As shown in FIG. 6, the second embodiment is different from the first embodiment in that the sensor unit 41 is provided.

More specifically, the sensor unit 41 is electrically connected between the first electrode 23 and the second electrode 24 and the solar cell 10. In the drawing, although the sensor unit 41 is connected in series between the first and second electrodes 23 and 24 and the solar cell 10, the sensor unit 41 may be connected in parallel. Further, in the drawing, although the sensor unit 41 is connected to the negative electrode side of the solar cell 10, the sensor unit 41 may be connected to the positive electrode side of the solar cell 10. Although the sensor unit 41 is driven by an external power source, the present invention is not limited to this configuration, and the sensor unit 41 may be driven by the solar cell as in the configuration to be described later. When the sensor unit 41 is driven by the solar cell, the device can be simplified, so that cost can be reduced.

The sensor unit 41 is driven by using, for example, the electromotive force generated by the solar cell 10 or the electromotive force obtained by the oxidation-reduction reaction of the first electrode 23 and the second electrode 24. Namely, the sensor unit 41 can be driven without a power source. The sensor unit 41 captures an electrical signal obtained by reaction of the first electrode 23 and the electrolytic solution 25a and reaction of the second electrode 24 and the electrolytic solution 25b. According to this constitution, the sensor unit 41 measures the pH of the electrolytic solutions 25a and 25b, concentrations of the electrolytic solutions 25a and 25b, compositions of the electrolytic solutions 25a and 25b, a pressure in the electrolytic tank 21, a temperature in the electrolytic tank 21, light intensity, and so on. Thus, the sensor unit 41 is particularly suitable for measuring an oxidation-reduction state of the redox medium.

Figure 7:
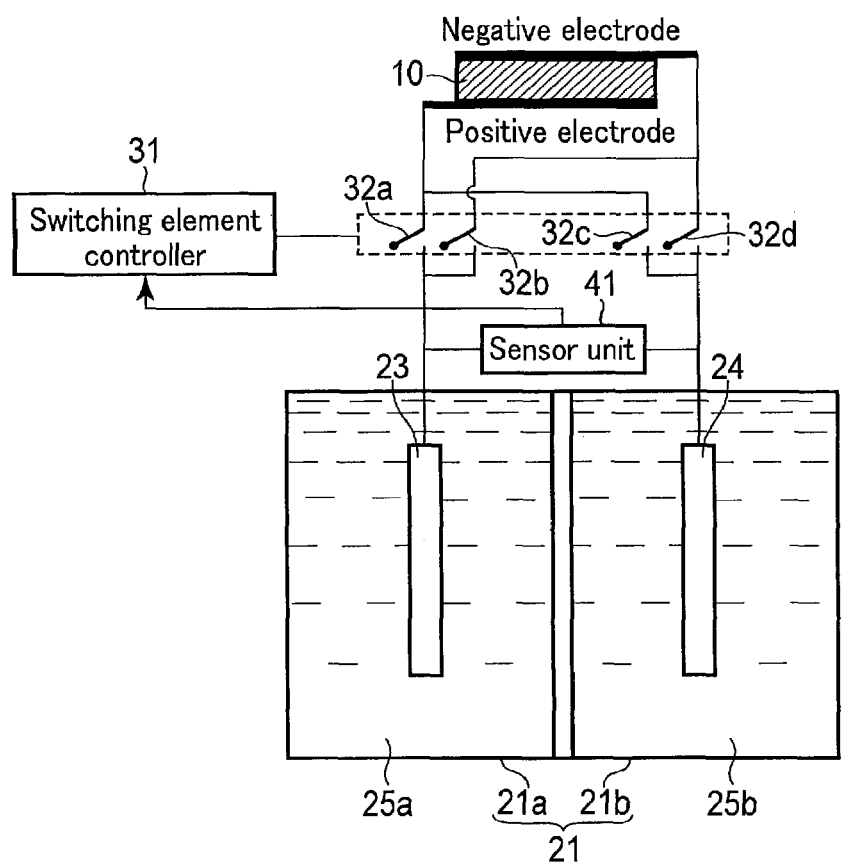
FIG. 7 is a schematic configuration diagram showing a variation of the photochemical reaction device according to the second embodiment.

Meanwhile, as shown in FIG. 7, the sensor unit 41 may be provided between the first electrode 23 and the second electrode, and the solution state of each solution may be measured using a liquid junction potential without a power source.

The sensor unit 41 outputs the above measurement results to a switching element controller 31. The switching element controller 31 automatically switches turning on/off of each of the switching elements 32a, 32b, 32c, and 32d according to the measurement results from the sensor unit 41. In particular, the sensor unit 41 detects a condition of an electrolyte and outputs the measurement results, whereby the energy conversion efficiency can be enhanced. For example, the sensor unit 41 outputs the measurement results according to presence or absence and concentrations of $Fe^{2+}$ and $Fe^{3+}$.

Notably, a mechanism automatically switched by the amount or pressure of a generated gas may be provided separately from the sensor unit 41. According to this constitution, energy or device cost required for automatic control portions of the sensor unit 41 and the switching element controller 31 is not required. Examples of such a mechanism include a mechanism including a tubular collecting pipe configured to collect a generated gas, a liquid stored in the collecting pipe, and a float floating on a liquid surface. In this mechanism, electrical connection may be switched by physical operation according to the buoyancy of the float at which an amount of a gas in the collecting pipe has reached an arbitrary amount. Further, a mechanism in which electrical connection is switched by physical operation according to the pressure of a generated gas may be provided.

Furthermore, a mechanism in which electrical connection is switched by the quantity of a flowing electric current may be provided. For example, there is an electric circuit in which a capacitor or the like stores electricity, and electrical connection is automatically switched once the electricity is arbitrarily stored.

There is a redox medium whose color is changed by oxidation-reduction reaction. For example, in iron sulfate, the color is changed to blue with a divalent ion and changed to yellow with a trivalent ion. Electrical connection may be automatically switched by detecting the change in color with the use of an optical sensor. Thus, a chemical species whose color is changed by an oxidation-reduction reaction or pH may be added to the electrolytic solutions 25a and 25b. Examples of a chemical species whose color is changed by pH include phenolphthalein and bromothymol blue. According to this constitution, the states of the electrolytic solutions 25a and 25b can be visually confirmed.

2-2. Effects of Second Embodiment

According to the second embodiment, the sensor unit 41 which measures the states of the electrolytic solutions 25a and 25b and the electrolytic tank 21 is provided. Consequently, the situations of the electrolytic solutions 25a and 25b and the electrolytic tank 21 configured to promote an oxidation-reduction reaction can be suitably adjusted. When the measurement results are output to the switching element controller 31, turning on/off of each of the switching elements 32a, 32b, 32c, and 32d can be automatically switched.

3. Third Embodiment

Hereinafter, a photochemical reaction device according to the third embodiment will be described using FIG. 8.

The photochemical reaction device according to the third embodiment includes an electrolyte storage tank 42 storing an electrolytic solution 25c including a redox medium. According to this constitution, an energy shortage in the redox medium in the oxidation-reduction reaction in a first tank 21a can be compensated. Hereinafter, the third embodiment will be described in detail.

In the third embodiment, the description of points similar to the first embodiment will be omitted, and points different from the first embodiment will be mainly described.

3-1. Configuration of Third Embodiment

Figure 8:
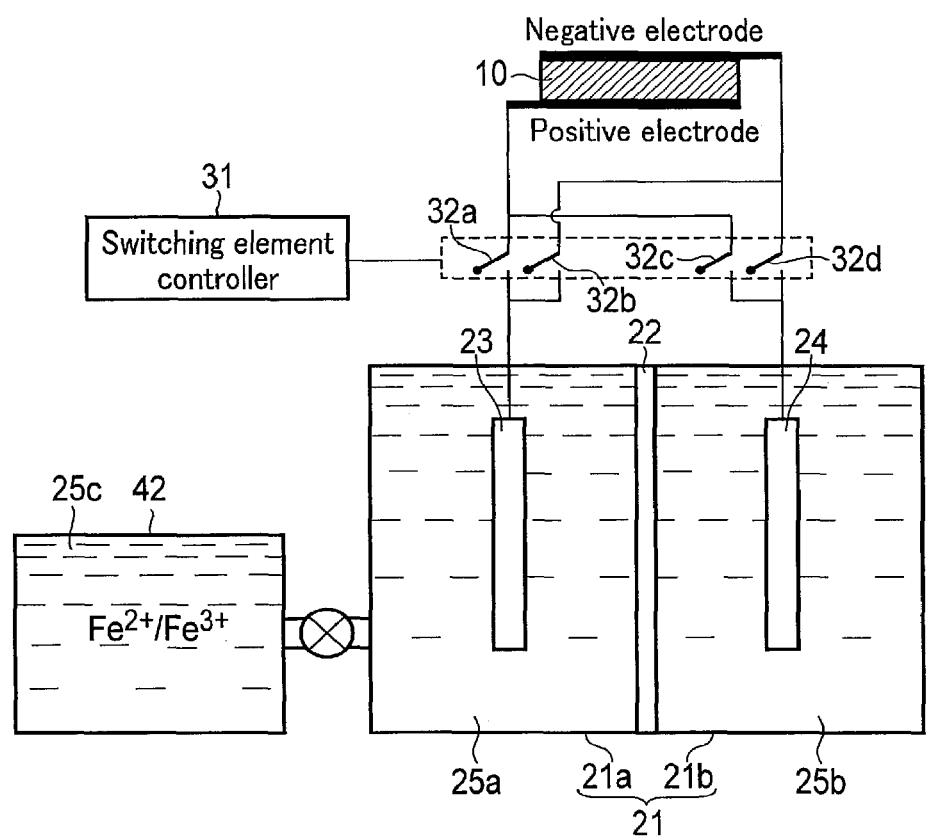
FIG. 8 is a schematic configuration diagram showing a configuration example of a photochemical reaction device according to a third embodiment.

FIG. 8 is a schematic configuration diagram showing a configuration example of the photochemical reaction device according to the third embodiment.

As shown in FIG. 8, the third embodiment is different from the first embodiment in that the electrolyte storage tank 42 is provided.

More specifically, the electrolyte storage tank 42 stores the electrolytic solution 25c therein. The electrolytic solution 25c is a solution including an oxidant and/or reductant of a redox medium (Red$^+$/Red). In this embodiment, the oxidant/reductant of the redox medium is $Fe^{3+}/Fe^{2+}$, for example. Thus, the electrolytic solution 25c is a solution including iron sulfate, for example. The present invention is not limited thereto, and it is sufficient that the oxidation-reduction potential of the redox medium is more than 0 V and less than 1.23 V, and it is desirable that the oxidation-reduction potential of the redox medium is an approximately intermediate value thereof. Namely, although the electrolytic solution 25c is different from the electrolytic solution 25a in a ratio of $Fe^{3+}$ and $Fe^{2+}$, they have substantially the same components.

The electrolyte storage tank 42 is connected to the first tank 21a and supplies the 25c into the first tank 21a. Namely, the electrolyte storage tank 42 can supply the oxidant/reductant of the redox medium into the first tank 21a according to the need.

3-2. Effects of Third Embodiment

According to the third embodiment, the electrolyte storage tank 42 storing the electrolytic solution 25c including the redox medium is provided. According to this constitution, the energy shortage in the redox medium in the oxidation-reduction reaction in the first tank 21a can be compensated. More specifically, the electrolyte storage tank 42 can compensate for insufficient $Fe^{2+}$ when an oxidation reaction is performed in the first tank 21a and can compensate for insufficient $Fe^{3+}$ when a reduction reaction is performed. Consequently, the oxidation-reduction reaction in the second tank 21b can be performed according to demand of $O_2$ and $H_2$ without considering a capacity of the redox medium in the first tank 21a.

4. Fourth Embodiment

Hereinafter, a photochemical reaction device according to the fourth embodiment will be described using FIG. 9.

In the photochemical reaction device according to the fourth embodiment, a first catalyst 51 in contact with a first electrode 23 and a second catalyst 52 in contact with a second electrode 24 are formed. According to this constitution, an oxidation-reduction reaction in a first tank 21a and a second tank 21b can be promoted. Hereinafter, the fourth embodiment will be described in detail.

In the fourth embodiment, the description of points similar to the first embodiment will be omitted, and points different from the first embodiment will be mainly described.

4-1. Configuration of Fourth Embodiment

FIG. 9 is a schematic configuration diagram showing a configuration example of the photochemical reaction device according to the fourth embodiment.

As shown in FIG. 9, the fourth embodiment is different from the first embodiment in that the first catalyst 51 is provided in the first tank 21a, and the second catalyst 52 is provided in the second tank 21b.

The first catalyst 51 is formed in contact with the first electrode 23 (a side surface of the first electrode 23 in the drawing). Although the first catalyst 51 is formed covering a portion of the first electrode 23, the first catalyst 51 may be formed covering the entirety of the first electrode 23. Thus, the first catalyst 51 is in contact with the electrolytic solution 25a. The first catalyst 51 is provided to enhance chemical reactivity near the first electrode 23. Namely, it is desirable that the first catalyst 51 is formed of a material which lowers overvoltage in the oxidation-reduction reaction of a redox medium (the reduction reaction of the oxidant and the oxidation reaction of the reductant). Examples of such a material include metal including Ag, Au, Al, Pt, Cu, Ni, Fe, Bi, or Co and complexes. The form of the first catalyst 51 is not limited to a thin film form, and the first catalyst 51 may have a lattice shape, a particle shape, or a wire shape.

The second catalyst 52 is formed in contact with the second electrode 24 (a side surface of the second electrode 24 in the drawing). Although the second catalyst 52 is formed covering a portion of the second electrode 24, the second catalyst 52 may be formed covering the entirety of the second electrode 24. Thus, the second catalyst 52 is in contact with an electrolytic solution 25b. The second catalyst 52 is provided to enhance chemical reactivity near the second electrode 24. Namely, it is desirable that the second catalyst 52 is formed of a material which lowers overvoltage in the oxidation reaction of $H_2O$ or a material which lowers overvoltage in the reduction reaction of $H^+$.

Examples of the material which lowers overvoltage in the oxidation reaction of $H_2O$ include binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), or ruthenium oxide (Ru—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as an Ru complex and an Fe complex.

Examples of the material which lowers overvoltage in the reduction reaction of $H^+$ include metals such as nickel (Ni), Fe, platinum (Pt), titanium (Ti), Au, Ag, zinc (Zn), palladium (Pd), gallium (Ga), manganese (Mn), cadmium (Cd), carbon (C), and graphene and alloy including at least one of the metals.

Pt is the material which lowers overvoltage in the oxidation reaction of $H_2O$. Since Pt is easily produced, the device can be simplified. Thus, it is desirable that Pt is used as the second catalyst 52. When Pt is not desired, because of costs or resources, a metal such as Co, Ni, Fe, or Mn as described above, a metal oxide thereof, or a combination thereof is desirably used.

The form of the second catalyst 52 is not limited to a thin film, and the second catalyst 52 may have a lattice shape, a particle shape, or a wire shape.

Meanwhile, the performance of the first catalyst 51 and the second catalyst 52 can be controlled by temperature control according to a temperature adjusting mechanism provided in an electrolytic tank 21. In order to stabilize and enhance the performances of the first catalyst 51 and the second catalyst 52, it is desirable that a temperature of a reaction system in at least each electrolytic tank is uniformized. From the viewpoint of a system, temperature distribution, and temperature management, it is more desirable that temperatures of all reaction systems are uniform.

4-2. Effects of Fourth Embodiment

According to the fourth embodiment, the first catalyst 51 is formed on the first electrode 23, and the second catalyst 52 is formed on the second electrode 24. By virtue of the provision of the first catalyst 51, the oxidation-reduction reaction of the redox medium in the first tank 21a can be promoted. Moreover, by virtue of provision of the second catalyst 52, the oxidation reaction of $H_2O$ in the second tank 21b or the reduction reaction of $H^+$ in the second tank 21b can be promoted.

5. Fifth Embodiment

Hereinafter, a photochemical reaction device according to the fifth embodiment will be described using FIGS. 10 to 12.

The fifth embodiment is a variation of the fourth embodiment. In the photochemical reaction device according to the fifth embodiment, a third electrode 26 and a third catalyst 53 are set in a second tank 21b. The oxidation reaction of $H_2O$ is performed by a second electrode 24, and the reduction reaction of $H^+$ is performed by the third electrode 26. According to this constitution, an overvoltage in each reaction can be lowered. Hereinafter, the fifth embodiment will be described in detail.

In the fifth embodiment, the description of points similar to the first embodiment will be omitted, and points different from the first embodiment will be mainly described.

5-1. Configuration of Fifth Embodiment FIG. 10 is a schematic configuration diagram showing a configuration example of the photochemical reaction device according to the fifth embodiment.

As shown in FIG. 10, the fifth embodiment is different from the first embodiment in that not only the second electrode 24 and a second catalyst 52 but also the third electrode 26 and the third catalyst 53 are set in the second tank 21b.

The second electrode 24 is set in the second tank 21b. According to this constitution, when an electrolytic solution 25b is stored in the second tank 21b, the second electrode 24 reacts with the electrolytic solution 25b by being brought into contact therewith. The second electrode 24 is electrically connected to a solar cell 10 through electric wires. More specifically, the second electrode 24 is electrically connected to a positive electrode of the solar cell 10 through a switching element 32c. The second electrode 24 is formed of a metal such as Ag, Au, Al, Cu, Ni, Fe, Bi, or Co, an alloy including at least one of the metals, a complex, or the like.

The third electrode 26 is set in the second tank 21b. According to this constitution, when the electrolytic solution 25b is stored in the second tank 21b, the third electrode 26 reacts with the electrolytic solution 25b by being brought into contact therewith. The third electrode 26 is electrically connected to the solar cell 10 through electric wires. More specifically, the third electrode 26 is electrically connected to a negative electrode of the solar cell 10 through a switching element 32d. The third electrode 26 is formed of metal such as Ag, Au, Al, Cu, Ni, Fe, Bi, or Co, alloy including at least one of the metals, a complex, or the like.

The second catalyst 52 is formed in contact with the second electrode 24 (a side surface of the second electrode 24 in the drawing). Although the second catalyst 52 is formed covering a portion of the second electrode 24, the second catalyst 52 may be formed covering the entirety of the second electrode 24. Thus, the second catalyst 52 is in contact with the electrolytic solution 25b. The second catalyst 52 is provided to enhance the chemical reactivity near the second electrode 24. Namely, it is desirable that the second catalyst 52 is formed of a material which lowers overvoltage in the oxidation reaction of $H_2O$.

Examples of a material which lowers overvoltage in the oxidation reaction of $H_2O$ include binary metal oxides such as Mn—O, Ir—O, Ni—O, Co—O, Fe—O, Sn—O, In—O, or Ru—O, ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as an Ru complex and an Fe complex.

The third catalyst 53 is formed in contact with the third electrode 26 (a side surface of the third electrode 26 in the drawing). Although the third catalyst 53 is formed covering a portion of the third electrode 26, the third catalyst 53 may be formed covering the entirety of the third electrode 26. Thus, the third catalyst 53 is in contact with the electrolytic solution 25b. The third catalyst 53 is provided to enhance chemical reactivity near the third electrode 26. Namely, it is desirable that the third catalyst 53 is formed of a material which lowers overvoltage in the reduction reaction of $H^+$.

Examples of the material which lowers overvoltage in the reduction reaction of $H^+$ include metals such as Ni, Fe, Pt, Ti, Au, Ag, Zn, Pd, Ga, Mn, Cd, C, and graphene and an alloy including at least one of the metals.

Although the third electrode 26 is provided in the second tank 21b, the present invention is not limited thereto. The third electrode 26 may be provided in a third tank (not shown) different from the second tank 21b. Moreover, a fourth electrode (not shown) different from the first electrode 23 may be provided in the first tank 21a. The oxidation reaction of the reductant of the redox medium may be performed at one of the first electrode 23 and the fourth electrode, and the reduction reaction of the oxidant of the redox medium may be performed at the other electrode. An electrolytic membrane isolating (separating) the electrodes may be provided. When the electrodes are separated, a catalyst suitable for each of oxidation and reduction of a redox complex can be used, and the efficiency of each can be enhanced. In addition, a product can be easily separated.

5-2. Operation of Fifth Embodiment

Figure 11:
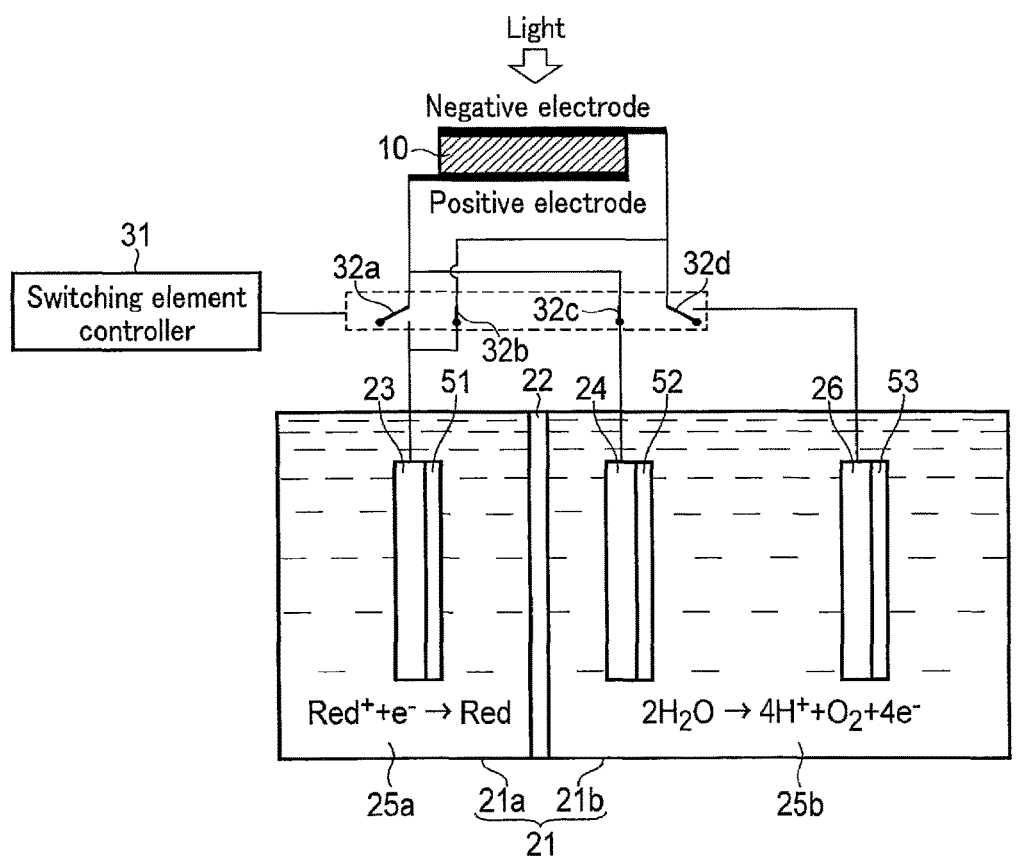
Figure 12:
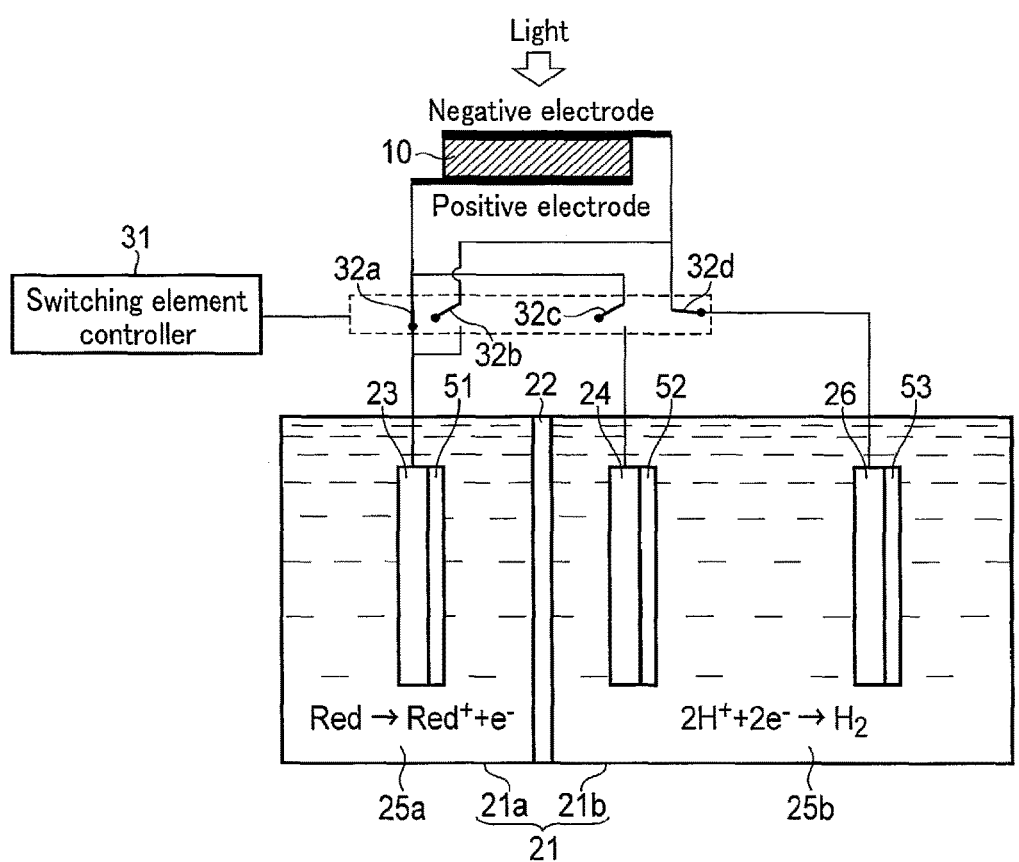
FIG. 12 is a view showing the operation of the photochemical reaction device according to the fifth embodiment.

FIGS. 11 and 12 are views showing operation of the photochemical reaction device according to the fifth embodiment. More specifically, FIG. 11 shows the reduction reaction of the oxidant of the redox medium and the oxidation reaction of $H_2O$, and FIG. 12 shows the oxidation reaction of the reductant of the redox medium and the reduction reaction of W.

As shown in FIG. 11, when oxygen is demanded, a switching element controller 31 turns a switching element 32a off and turns the switching element 32b on. Consequently, the first electrode 23 is electrically connected to the negative electrode of the solar cell 10. On the other hand, the switching element controller 31 turns the switching element 32d off and turns the switching element 32c on. Consequently, the second electrode 24 is electrically connected to the positive electrode of the solar cell 10. Meanwhile, the third electrode 26 is electrically shut off from the solar cell 10.

Meanwhile, an electrolytic solution 25a including the redox medium is stored in the first tank 21a so as to be in contact with the first electrode 23. On the other hand, the electrolytic solution 25b including $H_2O$ is stored in the second tank 21b so as to be in contact with the second electrode 24.

If light is applied from above (the transparent electrode 15 side) in the above state, charge separation occurs in the photovoltaic layer 16. Consequently, an electromotive force is generated in the solar cell 10.

The electrons generated in the photovoltaic layer 16 and having moved to the transparent electrode 15 which is the electrode on the negative electrode side further move to the first electrode 23 through electric wires. The electrons having moved to the first electrode 23 are used in the reduction reaction near the first electrode 23. On the other hand, the holes generated in the photovoltaic layer 16 and having moved to the substrate electrode 11 which is the electrode on the positive electrode side further move to the second electrode 24 through electric wires. The electrons having moved to the second electrode 24 are used in an oxidation reaction near the second electrode 24. More specifically, the reaction represented by the formula (1) occurs near the first electrode 23 which is in contact with the electrolytic solution 25a, and the reaction represented by the formula (2) occurs near the second electrode 24 which is in contact with the electrolytic solution 25b.

As shown in the formula (1), in the vicinity of the first electrode 23, the redox medium $Red^+$ is reduced (obtains electrons) to produce the redox medium Red, that is, a reductant of the redox medium.

On the other hand, as shown in the formula (2), in the vicinity of the second electrode 24, $H_2O$ is oxidized (loses electrons) to produce $O_2$ and $H^+$.

At that time, the second catalyst 52 which lowers overvoltage in the oxidation reaction of $H_2O$ is formed on the second electrode 24. Thus, the oxidation reaction of $H_2O$ near the second electrode 24 can be promoted.

As shown in FIG. 12, when hydrogen is demanded, the switching element controller 31 turns the switching element 32b off and turns the switching element 32a on. Consequently, the first electrode 23 is electrically connected to the positive electrode of the solar cell 10. On the other hand, the switching element controller 31 turns the switching element 32c off and turns the switching element 32d on. Consequently, the third electrode 26 is electrically connected to the negative electrode of the solar cell 10. Meanwhile, the second electrode 24 is electrically shut off from the solar cell 10.

Meanwhile, the electrolytic solution 25a including the redox medium is stored in the first tank 21a so as to be in contact with the first electrode 23. On the other hand, the electrolytic solution 25b including $H^+$ is stored in the second tank 21b so as to be in contact with the third electrode 26.

If light is applied from above (the transparent electrode 15 side) in the above state, charge separation occurs in the photovoltaic layer 16. Consequently, an electromotive force is generated in the solar cell 10.

The electrons generated in the photovoltaic layer 16 and having moved to the transparent electrode 15 which is the electrode on the negative electrode side further move to the third electrode 26 through electric wires. The electrons having moved to the third electrode 26 are used in a reduction reaction near the third electrode 26. On the other hand, the holes generated in the photovoltaic layer 16 and having moved to the substrate electrode 11 which is the electrode on the positive electrode side further move to the first electrode 23 through electric wires. The electrons having moved to the first electrode 23 are used in an oxidation reaction near the first electrode 23. More specifically, the reaction represented by the formula (3) occurs near the first electrode 23 which is in contact with the electrolytic solution 25a, and the reaction represented by the formula (4) occurs near the third electrode 26 which is in contact with the electrolytic solution 25b.

As shown in the formula (3), in the vicinity of the first electrode 23, the redox medium Red is oxidized (loses electrons) to produce the redox medium $Red^+$, that is, the oxidant of the redox medium.

On the other hand, as shown in the formula (4), in the vicinity of the third electrode 26, $H^+$ is reduced (obtains electrons) to produce $H_2$.

At that time, the third catalyst 53 which lowers overvoltage in the reduction reaction of $H^+$ is formed on the third electrode 26. Thus, the reduction reaction of $H^+$ near the third electrode 26 can be promoted.

In consideration of demands of hydrogen and oxygen or a demand of energy storage, such a series of operations can be suitably performed by switching a switch.

5-3. Effects of Fifth Embodiment

According to the fifth embodiment, the second electrode 24 which performs the oxidation reaction of $H_2O$ and the third electrode 26 which performs the reduction reaction of $H^+$ are set in the second tank 21b. The second catalyst 52 which lowers overvoltage in the oxidation reaction of $H_2O$ is formed on the second electrode 24, and the third catalyst 53 which lowers overvoltage in the reduction reaction of $H^+$ is formed on the third electrode 26. According to this constitution, both the oxidation reaction of $H_2O$ in the second tank 21b and the reduction reaction of $H^+$ in the second tank 21b can be promoted.

6. Sixth Embodiment

Hereinafter, a photochemical reaction device according to the sixth embodiment will be described using FIGS. 13 to 16.

The photochemical reaction device according to the sixth embodiment includes an external power supply 61, which is electrically connected to a first electrode 23 through switching elements 32e and 32f and electrically connected to a second electrode 24 through switching elements 32g and 32h, and a power demand unit 62 which is electrically connected to a solar cell 10 through a switching element 32i. According to this constitution, depending on various conditions such as presence or absence of surplus power and presence or absence of solar energy, the photochemical reaction device can be suitably operated as a solar cell electrolysis system, an external power supply electrolysis system, or a solar cell system such that the energy conversion efficiency becomes high. Hereinafter, the sixth embodiment will be described in detail.

In the sixth embodiment, the description of points similar to the first embodiment will be omitted, and points different from the first embodiment will be mainly described.

6-1. Configuration of Sixth Embodiment

FIG. 13 is a schematic configuration diagram showing a configuration example of the photochemical reaction device according to the sixth embodiment.

As shown in FIG. 13, the sixth embodiment is different from the first embodiment in that the external power supply 61 and the power demand unit 62 are installed. The external power supply 61 is provided outside an electrolytic tank 21. The first electrode 23 is electrically connected to a positive electrode of the external power supply 61 through the switching element 32e, and the second electrode 24 is also electrically connected to the positive electrode of the external power supply 61 through the switching element 32g. On the other hand, the first electrode 23 is electrically connected to the negative electrode of the external power supply 61 through the switching element 32f, and the second electrode 24 is also electrically connected to the negative electrode of the external power supply 61 through the switching element 32h.

The power demand unit 62 is electrically connected to the solar cell 10 through the switching element 32i.

A switching element controller 31 controls on/off of the switching elements 32a, 32b, 32c, 32d, 32e, 32f, 32g, 32h, and 32i depending on various conditions. When the switching elements 32a, 32b, 32c, and 32d are controlled, the first electrode 23 and the second electrode 24 can be connected to both the positive electrode and the negative electrode of the solar cell 10. Further, when switching elements 32e, 32f, 32g, and 32h are controlled, the first electrode 23 and the second electrode 24 can be connected to both the positive electrode and the negative electrode of the external power supply 61. Furthermore, when the switching element 32i is controlled, connection between the solar cell 10 and the power demand unit 62 can be controlled.

For example, when there is mainly surplus power and when there is solar energy, the photochemical reaction device functions as a solar cell electrolysis system. More specifically, the switching element controller 31 controls on/off of the switching elements 32a, 32b, 32c, and 32d while maintaining off of each of the switching elements 32e, 32f, 32g, 32h, and 32i. Namely, the operation in the first embodiment as described above is performed.

On the other hand, when there is mainly surplus power and when there is no solar energy, the photochemical reaction device functions as an external power supply electrolysis system. More specifically, the switching element controller 31 controls on/off of the switching elements 32e, 32f, 32g, and 32h while maintaining off of each of the switching elements 32a, 32b, 32c, 32d, and 32i.

When there is mainly no surplus power, the photochemical reaction device functions as the solar cell system. More specifically, the switching element controller 31 controls on/off of the switching element 32i while maintaining off of each of the switching elements 32a, 32b, 32c, 32d, 32e, 32f, 32g, and 32h.

The details of the solar cell electrolysis system, the external power supply electrolysis system, and the solar cell system will be described later.

6-2. Operation of Sixth Embodiment

Figure 15:
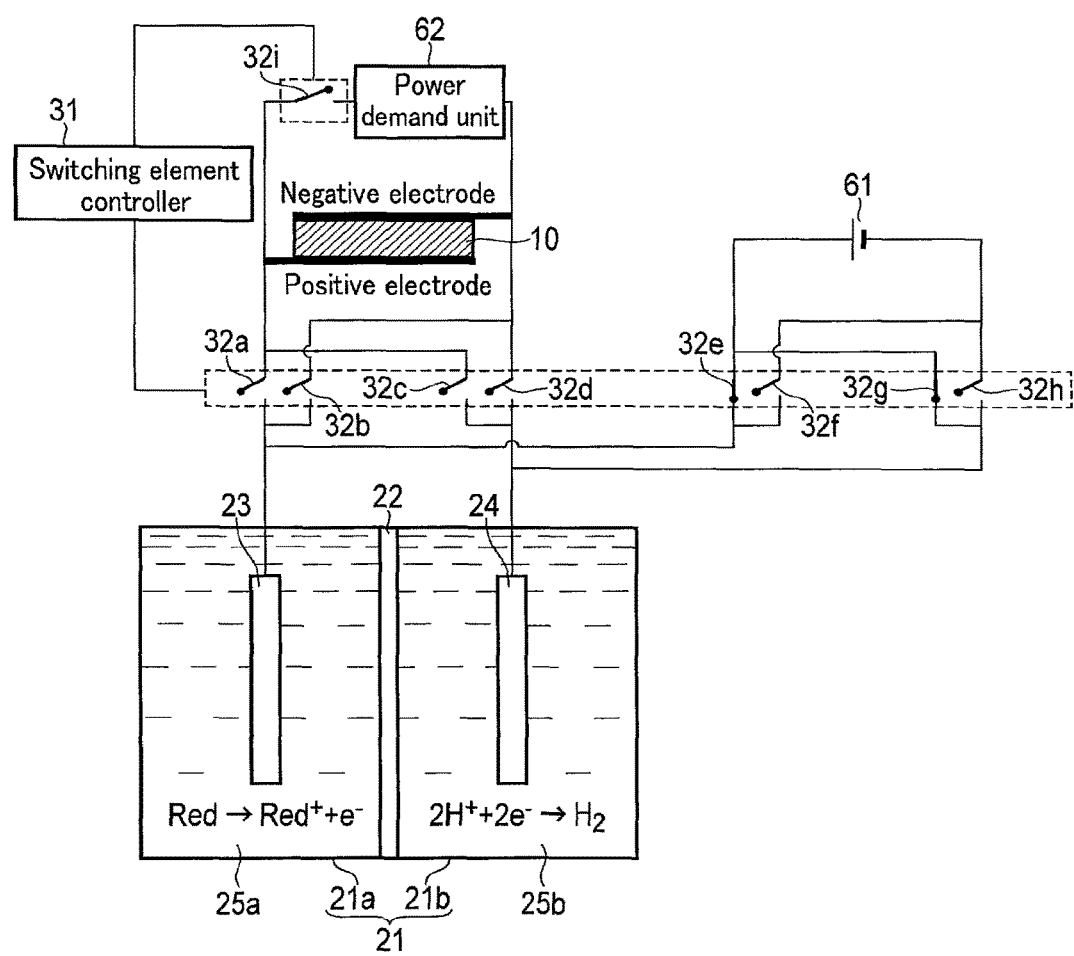

FIGS. 14 and 15 are views showing operation of the photochemical reaction device according to the sixth embodiment when the photochemical reaction device is used as the external power supply electrolysis system. More specifically, FIG. 14 shows the reduction reaction of an oxidant of a redox medium and the oxidation reaction of $H_2O$, and FIG. 15 shows the oxidation reaction of a reductant of the redox medium and the reduction reaction of $H^+$. When there is mainly surplus power and when there is no solar energy, the external power supply electrolysis system is used.

As shown in FIGS. 14 and 15, when the photochemical reaction device is used as the external power supply electrolysis system, the switching element controller 31 controls on/off of the switching elements 32e, 32f, 32g, and 32h while maintaining off of each of the switching elements 32a, 32b, 32c, 32d, and 32i.

As shown in FIG. 14, where oxygen is demanded, the switching element controller 31 turns the switching element 32e off and turns the switching element 32f on. Consequently, the first electrode 23 is electrically connected to the negative electrode of the external power supply 61. On the other hand, the switching element controller 31 turns the switching element 32h off and turns the switching element 32g on. Consequently, the second electrode 24 is electrically connected to the positive electrode of the external power supply 61.

An electrolytic solution 25a including the redox medium is stored in the first tank 21a so as to be in contact with the first electrode 23. Meanwhile, an electrolytic solution 25b including $H_2O$ is stored in a second tank 21b so as to be in contact with the second electrode 24.

If an electromotive force is generated in the external power supply 61 in the above state, the electrons further move from the negative electrode side of the external power supply 61 to the first electrode 23 through electric wires. The electrons having moved to the first electrode 23 are used in the reduction reaction near the first electrode 23. On the other hand, the holes further move from the positive electrode side of the external power supply 61 to the second electrode 24 through electric wires. The electrons having moved to the second electrode 24 are used in the oxidation reaction near the second electrode 24. More specifically, the reaction represented by the formula (1) occurs near the first electrode 23 which is in contact with the electrolytic solution 25a, and the reaction represented by the formula (2) occurs near the second electrode 24 which is in contact with the electrolytic solution 25b.

As shown in the formula (1), in the vicinity of the first electrode 23, the redox medium $Red^+$ is reduced (obtains electrons) to produce the redox medium Red, that is, a reductant of the redox medium.

On the other hand, as shown in the formula (2), in the vicinity of the second electrode 24, $H_2O$ is oxidized (loses electrons) to produce $O_2$ and $H^+$.

As shown in FIG. 15, when hydrogen is demanded, the switching element controller 31 turns the switching element 32$f$ off and turns the switching element 32$e$ on. Consequently, the first electrode 23 is electrically connected to the positive electrode of the external power supply 61. On the other hand, the switching element controller 31 turns the switching element 32$h$ off and turns the switching element 32$g$ on. Consequently, the third electrode 26 is electrically connected to the negative electrode of the external power supply 61.

Meanwhile, the electrolytic solution 25$a$ including the redox medium is stored in the first tank 21$a$ so as to be in contact with the first electrode 23. On the other hand, the electrolytic solution 25$b$ including $H^+$ is stored in the second tank 21$b$ so as to be in contact with the third electrode 26.

If an electromotive force is generated in the external power supply 61 in the above state, the electrons further move from the negative electrode side of the external power supply 61 to the second electrode 24 through electric wires. The electrons having moved to the second electrode 24 are used in the reduction reaction near the second electrode 24. On the other hand, the holes further move from the positive electrode side of the external power supply 61 to the first electrode 23 through electric wires. The electrons having moved to the first electrode 23 are used in the oxidation reaction near the first electrode 23. More specifically, the reaction represented by the formula (3) occurs near the first electrode 23 which is in contact with the electrolytic solution 25$a$, and the reaction represented by the formula (4) occurs near the second electrode 24 which is in contact with the electrolytic solution 25$b$.

As shown in the formula (3), in the vicinity of the first electrode 23, the redox medium Red is oxidized (loses electrons) to produce the redox medium Red$^+$, that is, the oxidant of the redox medium.

On the other hand, as shown in the formula (4), in the vicinity of the third electrode 26, $H^+$ is reduced (obtains electrons) to produce $H_2$.

As described above, in the external power supply electrolysis system, an electromotive force is generated in the external power supply 61 by electrical energy of surplus power, and the oxidation-reduction reaction (electrolytic reaction) is generated by the electromotive force to produce chemical energy. Namely, electrical energy can be converted into chemical energy.

Figure 16:
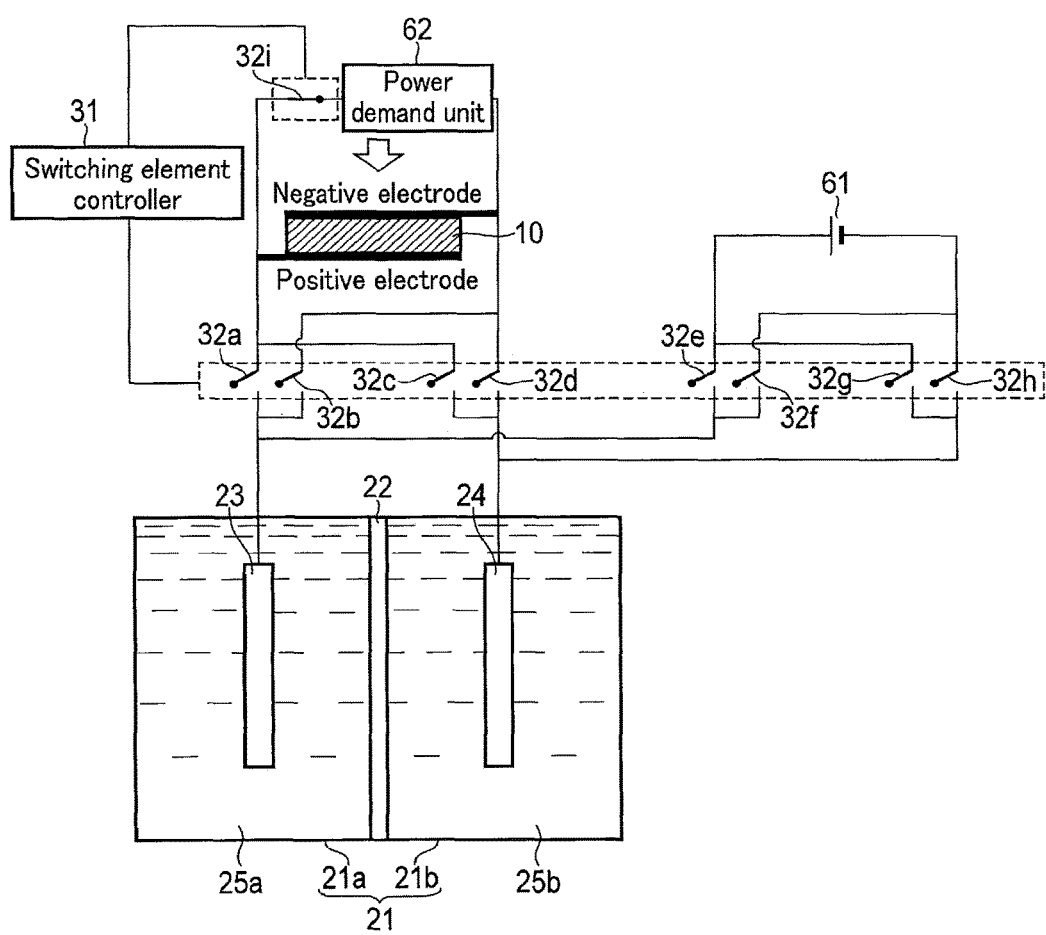
FIG. 16 is a view showing operation of the photochemical reaction device according to the sixth embodiment when the photochemical reaction device is used as a solar cell system.

FIG. 16 is a view showing operation of the photochemical reaction device according to the sixth embodiment when the photochemical reaction device is used as the solar cell system. When there is mainly no surplus power, the solar cell system is used.

As shown in FIG. 16, when the photochemical reaction device is used as the solar cell system, the switching element controller 31 controls on/off of the switching element 32$i$ while maintaining off of each of the switching elements 32$a$, 32$b$, 32$c$, 32$d$, 32$e$, 32$f$, 32$g$, and 32$h$.

When electrical power is demanded by the power demand unit 62, the switching element controller 31 turns on the switching element 32$i$. Consequently, the solar cell 10 and the power demand unit 62 are electrically connected.

If light is applied from above (the transparent electrode 15 side) in the above state, charge separation occurs in a photovoltaic layer 16. Consequently, an electromotive force is generated in the solar cell 10. By virtue of the electromotive force generated in the solar cell 10, electrical power can be supplied to the power demand unit 62.

As described above, in the solar cell system, an electromotive force is generated in the solar cell 10 by solar energy, and electrical energy is generated by the electromotive force. Namely, solar energy can be converted into electrical energy.

When there is mainly surplus power and when there is solar energy, the solar cell electrolysis system is used.

When the photochemical reaction device is used as the solar cell electrolysis system, the switching element controller 31 controls on/off of the switching elements 32$a$, 32$b$, 32$c$, and 32$d$ while maintaining off of each of the switching elements 32$e$, 32$f$, 32$g$, 32$h$, and 32$i$. Namely, operation similar to the above-described operation in the first embodiment is performed.

As described above, in the solar cell electrolysis system, an electromotive force is generated in the solar cell 10 by solar energy, and the oxidation-reduction reaction (electrolytic reaction) is generated by the electromotive force to produce chemical energy. Namely, solar energy can be converted into chemical energy.

When the photochemical reaction device is used as the solar cell electrolysis system, it is considered that light intensity may be low, and the sensor unit 41 shown in FIG. 6 does not function by the electromotive force in the solar cell 10. In this case, the sensor unit 41 is temporarily operated by the external power supply 61, whereby various requirements may be measured. Meanwhile, the same applies to the case where the photochemical reaction device is used as the external power supply electrolysis system. Namely, when the photochemical reaction device is used as the external power supply electrolysis system, the sensor unit 41 is temporarily operated by the electromotive force in the solar cell 10, whereby various requirements may be measured.

Meanwhile, when the voltage of the external power supply 61 can be arbitrarily adjusted, the positive electrode and the negative electrode can be reversed. In this case, the switching element 32$e$ or 32$f$ and the switching element 32$g$ or 32$h$ are not required.

Meanwhile, light energy may be accumulated as a reductant of a material by the electromotive force in the solar cell 10 in the solar cell electrolysis system. In other words, a material is reduced by the light energy, and the reduced material may be accumulated as reduction energy. Examples in which the light energy is converted into the reduction energy include conversion from trivalent iron ion ($Fe^{3+}$) to divalent iron ion ($Fe^{2+}$) according to the light energy and conversion from monovalent iodine ion ($I^-$) to trivalent iodine ion ($I^{3-}$) according to the light energy. Moreover, $H^+$ may be accumulated as a reductant.

As described above, the reductant obtained in the solar cell electrolysis system may be further reduced by the electromotive force according to the external power supply 61 in the external power supply electrolysis system. Consequently, the reductant can be converted into a reductant having higher energy density.

Meanwhile, electrical energy may be obtained from the reduction energy by performing a reaction in which a reductant obtained in the solar cell electrolysis system is oxidized to be returned. Namely, the solar cell electrolysis system having a power storage function is provided. Like an ordinary cell, the power storage function may be provided by the mutual action among electrodes with the use of a compound, such as lithium, as an electrolyte.

Like a redox flow cell, energy is accumulated based on changes in ionic valence and the like as in the oxidation-reduction reaction of vanadium, and according to need, electrical energy or chemical energy may be obtained. Consequently, surplus power, power consumption, or variation in power generation can be leveled, and energy can be obtained efficiently. Thus, a tank (not shown) (the electrolyte storage tank shown in FIG. 8) configured to store energy of a redox medium may be provided. Accordingly, a regenerative energy system which can achieve energy saving and reduction in $CO_2$ emission and, at the same time, has an energy accumulation system is realized.

Further, the photochemical reaction device can be used as a fuel cell. More specifically, water is decomposed by light energy to produce hydrogen and oxygen. The obtained hydrogen and oxygen share at least one electrode, whereby water is produced by hydrogen and oxygen. Consequently, electrical power can be obtained. Namely, the fuel cell can be integrated with the solar cell electrolysis system. The reaction efficiency can be improved by providing a flow passage in the electrolytic tank 21 as in an ordinary fuel cell.

6-3. Effects of Sixth Embodiment

According to the sixth embodiment, the external power supply 61, which is electrically connected to the first electrode 23 through the switching elements 32e and 32f and electrically connected to the second electrode 24 through the switching elements 32g and 32h, and the power demand unit 62 which is electrically connected to the solar cell 10 through the switching element 32i are provided.

According to the above constitution, the photochemical reaction device can be operated as a solar cell electrolysis system by using the solar cell 10, the first electrode 23, and the second electrode 24. Further, the photochemical reaction device can be operated as an external power supply electrolysis system by using the external power supply 61, the first electrode 23, and the second electrode 24. Furthermore, the photochemical reaction device can be operated as a solar cell system by using the solar cell 10 and the power demand unit 62.

Namely, depending on various conditions such as presence or absence of surplus power and presence or absence of solar energy, the photochemical reaction device can be suitably operated as a solar cell electrolysis system, an external power supply electrolysis system, or a solar cell system such that the energy conversion efficiency becomes high.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A photochemical reaction device comprising: a solar cell;
   an electrolytic tank having a first tank storing a first solution comprising an oxidant and/or reductant of a redox medium and a second tank storing a second solution comprising water and/or protons, the first tank and second tank separated by a permeable membrane;
   a first electrode set in the first tank, electrically connected to a positive electrode of the solar cell through a first switching element, and electrically connected to a negative electrode of the solar cell through a second switching element;
   a second electrode set in the second tank and electrically connected to the positive electrode of the solar cell through a third switching element and not directly connected to the negative electrode of the solar cell;
   a third electrode set in the second tank and electrically connected to the negative electrode of the solar coil through a fourth switching element and not directly connected to the positive electrode of the solar cell;
   a switching element controller which controls on/off of the first switching element to the fourth switching element;
   a first catalyst formed in contact with the first electrode and promoting an oxidation reaction and a reduction reaction of the redox medium in the first electrode;
   a second catalyst formed in contact with the second electrode and promoting an oxidation reaction of water in the second electrode; and
   a third catalyst formed in contact with the third electrode and promoting a reduction reaction of proton in the third electrode, wherein
   the switching element controller is configured to turn the second switching element and the third switching element on and to turn the first switching element and the fourth switching element off to reduce the oxidant of the redox medium in the first tank and oxidize water in the second tank to produce oxygen, and
   the switching element controller is configured to turn the first switching element and the fourth switching element on and to turn the second switching element and the third switching element off to oxidize the reductant the redox medium in the first tank and reduce proton in the second tank to produce hydrogen.

2. The photochemical reaction device of claim 1, wherein the second solution comprises carbon dioxide, the switching element controller turns the first switching element and the fourth switching element on and turns the second switching element and the third switching element off to oxidize the reductant of the redox medium in the first tank and reduce carbon dioxide in the second tank to produce a carbon compound.

3. The photochemical reaction device of claim 1, wherein the second solution comprises carbon dioxide, the switching element controller turns the first switching element and the fourth switching element on and turns the second switching element and the third switching element off to oxidize the reductant of the redox medium in the first tank and reduce carbon dioxide in the second tank to produce a carbon compound.

4. The photochemical reaction device of claim 1, wherein a standard oxidation-reduction potential of the redox medium is smaller than the standard oxidation-reduction potential of water/oxygen and larger than the standard oxidation-reduction potential of proton/hydrogen.

5. The photochemical reaction device of claim 1, wherein the second solution comprises a sacrificial reagent having a standard oxidation-reduction potential smaller than the standard oxidation-reduction potential of water/oxygen and larger than the standard oxidation-reduction potential of the redox medium.

6. The photochemical reaction device of claim 1, wherein the solar cell is a single junction cell having a pair of pn junctions.

7. The photochemical reaction device of claim 1, further comprising a sensor which measures states of the first solution, the second solution, the first tank, and the second tank.

8. The photochemical reaction device of claim 1, further comprising an electrolyte storage tank storing a third solution which is the same as the first solution and supplying the third solution to the first tank.

9. The photochemical reaction device of claim 1, further comprising: an external power supply; and a power demand unit,
wherein the first electrode is electrically connected to a positive electrode of the external power supply through a fifth switching element and electrically connected to a negative electrode of the external power supply through a sixth switching element,
the second electrode is electrically connected to the positive electrode of the external power supply through a seventh switching element,
the third electrode is electrically connected to the negative electrode of the external power supply through an eighth switching element,
the power demand unit is electrically connected to the solar cell through a ninth switching element, and
the switching element controller controls on/off of the fifth switching element to the ninth switching element.

10. A chemical reaction system comprising:
a solar cell;
an external power source;
an electrolytic tank having a first tank and a second tank, the first tank and the second tank separated by a permeable membrane;
a first electrode set in the first tank, electrically connected to a positive electrode of the solar cell through a first switching element, electrically connected to a negative electrode of the solar cell through a second switching element, electrically connected to a positive electrode of the external power source through a third switching element, and electrically connected to a negative electrode of the external power source through a fourth switching element;
a second electrode set in the second tank, electrically connected to the positive electrode of the solar cell through a fifth switching element, electrically connected to a positive electrode of the external power source through a seventh switching element, and not directly connected to the negative electrode of the solar cell or the negative electrode of the external power source;
a third electrode set in the second tank, electrically connected to the negative electrode of the solar cell through a sixth switching element and electrically connected to a negative electrode of the external power source through a eighth switching element, and not directly connected to the positive electrode of the solar cell or the positive electrode of the external power source;
a power demand unit electrically connected to the solar cell through a ninth switching element; and
a switching element controller which controls on/off of the first switching element to the ninth switching element, wherein
the switching element controller controls connection of the first switching element to the ninth switching element based on one or more conditions including presence or absence of surplus power and presence or absence of solar energy.

11. The chemical reaction system of claim 10, wherein
the electrolytic tank has the first tank to store a first solution comprising an oxidant and/or reductant of a redox medium and the second tank to store a second solution comprising water and/or proton.

12. The chemical reaction system of claim 10, wherein the switching element controller is configured to keep the third, fourth, seventh, eighth and ninth switching elements off and to control turning on and off of the first, second, fifth and sixth switching elements, so that the chemical reaction system functions as an external power electrolysis system.

13. The chemical reaction system of claim 10, wherein the switching element controller is configured to keep the first, second, fifth, sixth and ninth switching elements off and to control turning on and off of the third, fourth, seventh and eighth switching elements, so that the chemical reaction system functions as an external power electrolysis system.

14. The chemical reaction system of claim 10, wherein the switching element controller is configured to keep the first to eighth switching elements off and to control turning on and off of the ninth switching element, so that the chemical reaction system functions as a solar cell system.

15. The chemical reaction system of claim 10, wherein the switching element controller is configured to keep the third, fourth, seventh and eighth switching elements off and to control turning on and off of the first, second, fifth, sixth and ninth switching elements, so that the chemical reaction system functions as a solar cell electrolysis system having a power storage configured to function to supply electrical power to the power demand unit.

16. The chemical reaction system of claim 10, wherein at least one of the first electrode and the second electrode is used as an electrode of a fuel cell.

* * * * *